(12) United States Patent
Hatori et al.

(10) Patent No.: US 9,128,452 B2
(45) Date of Patent: Sep. 8, 2015

(54) LUBRICANT SUPPLY SYSTEM, IMAGE FORMING APPARATUS, AND PROCESS CARTRIDGE

(71) Applicants: Satoshi Hatori, Kanagawa (JP); Kenji Honjoh, Kanagawa (JP); Ryohta Gotoh, Tokyo (JP); Akira Fujimori, Kanagawa (JP); Kaoru Yoshino, Toyko (JP); Naohiro Kumagai, Kanagawa (JP); Hideyasu Seki, Chiba (JP); Shinichi Kawahara, Tokyo (JP); Takeshi Shintani, Kanagawa (JP); Nobuo Kuwabara, Kanagawa (JP); Norio Kudoh, Kanagawa (JP); Daisuke Tomita, Kanagawa (JP)

(72) Inventors: Satoshi Hatori, Kanagawa (JP); Kenji Honjoh, Kanagawa (JP); Ryohta Gotoh, Tokyo (JP); Akira Fujimori, Kanagawa (JP); Kaoru Yoshino, Toyko (JP); Naohiro Kumagai, Kanagawa (JP); Hideyasu Seki, Chiba (JP); Shinichi Kawahara, Tokyo (JP); Takeshi Shintani, Kanagawa (JP); Nobuo Kuwabara, Kanagawa (JP); Norio Kudoh, Kanagawa (JP); Daisuke Tomita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/289,925

(22) Filed: May 29, 2014

(65) Prior Publication Data
US 2014/0363178 A1 Dec. 11, 2014

(30) Foreign Application Priority Data
Jun. 5, 2013 (JP) .................................. 2013-118503

(51) Int. Cl.
G03G 15/00 (2006.01)
G03G 21/00 (2006.01)
F16N 15/00 (2006.01)
G03G 21/18 (2006.01)

(52) U.S. Cl.
CPC ............ *G03G 21/0094* (2013.01); *F16N 15/00* (2013.01); *G03G 15/55* (2013.01); *G03G 21/18* (2013.01)

(58) Field of Classification Search
CPC ... G03G 21/0094; G03G 21/18; G03G 15/55; F16N 15/00
See application file for complete search history.

(56) References Cited

U.S. PATENT DOCUMENTS
2007/0059067 A1 3/2007 Tanaka et al.
2007/0068738 A1 3/2007 Kawahara et al.
(Continued)

FOREIGN PATENT DOCUMENTS
JP 8-146842 6/1996
JP 8-314346 11/1996
JP 2010-271665 12/2010

*Primary Examiner* — Clayton E Laballe
*Assistant Examiner* — Ruifeng Pu
(74) *Attorney, Agent, or Firm* — Oblon, McClelland, Maier & Neustadt, L.L.P.

(57) ABSTRACT

A solid lubricant supply system includes a solid lubricant supplier to receive and supply solid lubricant to a solid lubricant supplying target. A pair of first and second moveable planar electrodes is opposed to each other. The second moveable planar electrode is partially moved toward the first moveable planar electrode as the solid lubricant is consumed. A residual solid lubricant quantity detecting unit is provide to detect a quantity of the residual solid lubricant at a first stage, in which the residual solid lubricant quantity is below a given level, by detecting electric conduction between the pair of first and second moveable planar electrodes when the pair of first and second moveable planar electrodes contacts each other. The first moveable planar electrode is enabled to further move together with the second moveable planar electrode when it is contacted and pressed by the second moveable planar electrode.

20 Claims, 14 Drawing Sheets

(56) References Cited

U.S. PATENT DOCUMENTS

| | | |
|---|---|---|
| 2007/0172273 A1 | 7/2007 | Harada et al. |
| 2007/0258743 A1 | 11/2007 | Shakuto et al. |
| 2008/0181689 A1 | 7/2008 | Fujimori |
| 2009/0060600 A1 | 3/2009 | Ninomiya et al. |
| 2009/0103944 A1 | 4/2009 | Shintani et al. |
| 2009/0241830 A1 | 10/2009 | Koike et al. |
| 2010/0021205 A1 | 1/2010 | Honjoh et al. |
| 2010/0183349 A1 | 7/2010 | Shintani et al. |
| 2011/0076075 A1 | 3/2011 | Arai et al. |
| 2011/0123239 A1 | 5/2011 | Azeyanagi et al. |
| 2011/0170908 A1 | 7/2011 | Saitoh et al. |
| 2011/0217101 A1 | 9/2011 | Okamoto et al. |
| 2011/0274474 A1 | 11/2011 | Arai et al. |
| 2012/0234188 A1 | 9/2012 | Kawahara et al. |
| 2012/0315053 A1 | 12/2012 | Kudo et al. |
| 2012/0321330 A1 | 12/2012 | Kudo et al. |
| 2013/0243449 A1 | 9/2013 | Hatori et al. |
| 2014/0037302 A1* | 2/2014 | Gotoh et al. .................... 399/24 |
| 2014/0037303 A1* | 2/2014 | Tomita et al. .................. 399/24 |
| 2014/0037304 A1* | 2/2014 | Uenishi et al. ................. 399/24 |

* cited by examiner

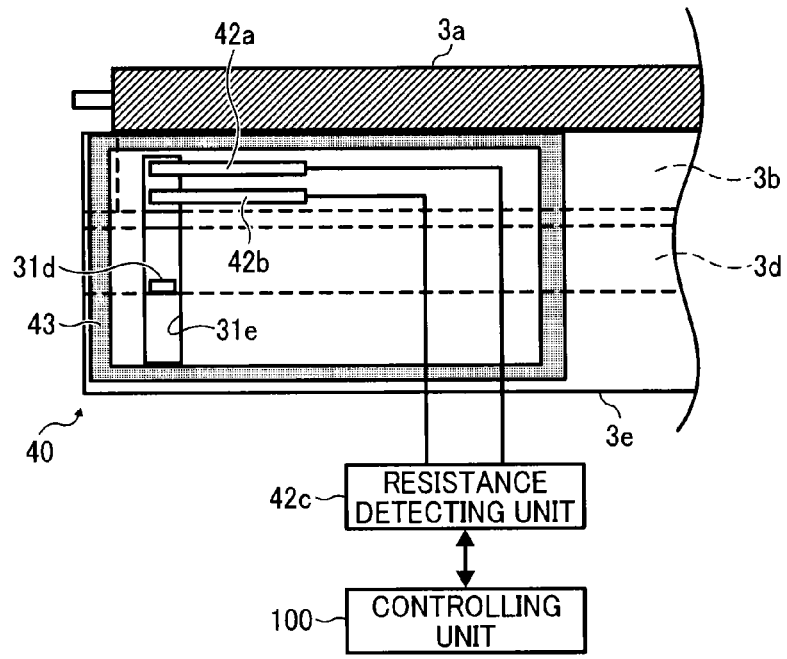
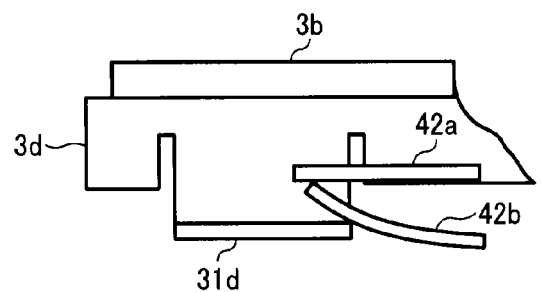
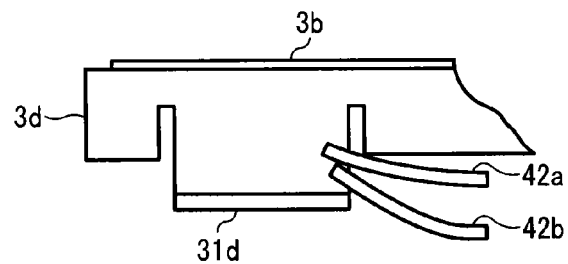

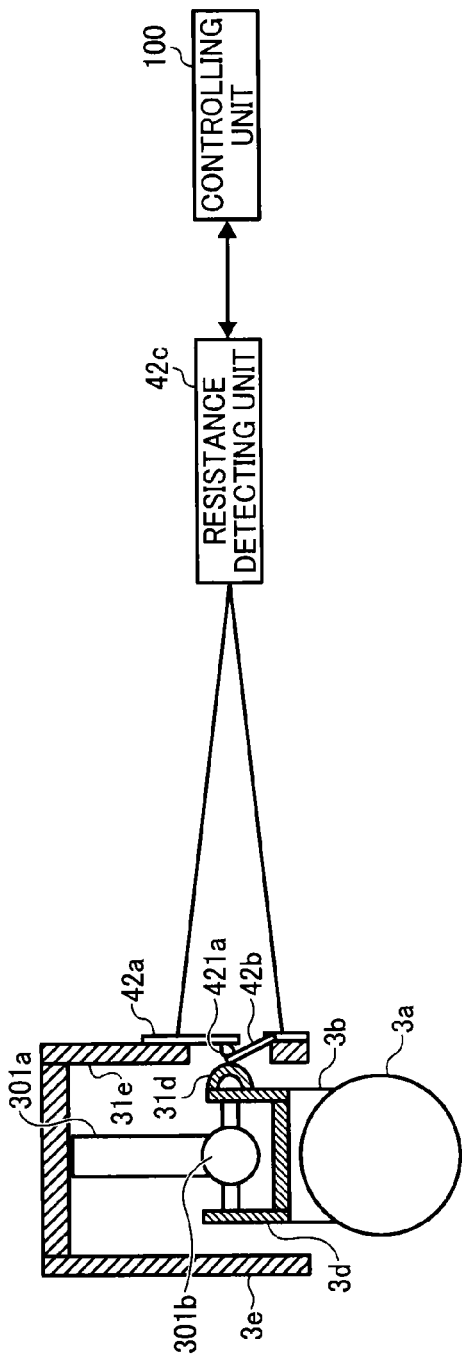
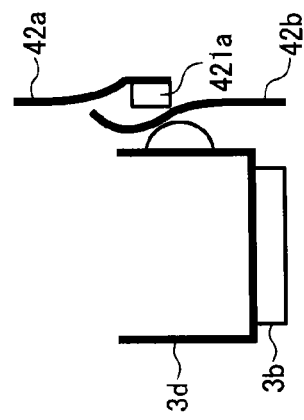
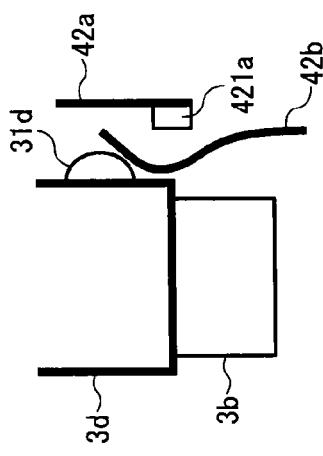

LUBRICANT SUPPLY SYSTEM, IMAGE FORMING APPARATUS, AND PROCESS CARTRIDGE

CROSS-REFERENCE TO RELATED APPLICATION

This patent application is based on and claims priority pursuant to 35 U.S.C. §119(a) to Japanese Patent Application No. 2013-118503, filed on Jun. 5, 2013 in the Japan Patent Office, the entire disclosure of which is hereby incorporated by reference herein.

BACKGROUND

1. Technical Field

This invention relates to a solid lubricant supply system, an image forming apparatus, and a process cartridge.

2. Related Art

An image forming apparatus, such as a printer, a facsimile machine, a copier, etc., with a solid lubricant supply system that supplies solid lubricant to a surface of an image bearer, such as a photoconductor, an intermediate transfer belt, etc., to either protect or minimize a friction on the image bearer is known.

Since a protecting function of the solid lubricant does not work and the image bearer may wear out or deteriorate if images continue to be formed after the solid lubricant runs out, the image forming apparatus typically has a residual solid lubricant quantity detecting unit to monitor the amount of lubricant remaining.

FIG. 16 is a schematic perspective view of a conventional solid lubricant supply system that includes a residual solid lubricant quantity-detecting unit. Specifically, as shown there, the conventional solid lubricant supply system is configured by a solid lubricant holding unit 143 made of conductive member and a solid lubricant 140. The conventional solid lubricant supply system also includes a first fixed electrode 181 that contacts one end of the solid lubricant holding unit 143 when the residual quantity of solid lubricant declines to a given level. The solid lubricant supply system also includes a second fixed electrode 182 that engages with the other end of the solid lubricant holding unit 143 when the residual quantity of solid lubricant declines to a given level as well. A detecting circuit 183 is connected to the first and second fixed electrodes 181 and 182 that supplies a given voltage between the first and second electrodes and detects whether or not a current flows therebetween. The solid lubricant-holding unit 143 is biased toward a solid lubricant supplying unit, not shown, by a pair of springs 142.

At the early stage of usage of the solid lubricant, the solid lubricant holding unit 143 is separated from these electrodes and no current flows therebetween. When the solid lubricant is gradually scraped off by sliding friction of the solid lubricant supplying unit, the solid lubricant holding unit 143 moves toward the solid lubricant-supplying unit due to biasing force of the pair of spring 142. When the quantity of the solid lubricant 140 becomes less than a given level, the conductive solid lubricant holding unit 143 engages both the first and second fixed electrodes 181 and 182 and a current flows between these first and second electrodes, the detecting circuit 183 determines that the quantity of the solid lubricant is less than the given level. When it is determined that the quantity of solid lubricant is less than the given level by the detecting circuit 183, a message to the effect that the solid lubricant has run out and needs to be replaced with a new solid lubricant is displayed by a displaying circuit 184 on the image forming apparatus.

After the conductive solid lubricant holding unit 143 engages both the first and second fixed electrodes 181 and 182, and accordingly the detecting circuit 183 determines that the quantity of solid lubricant is less than the given level, the solid lubricant holding unit 143 is inhibited to move any more toward the solid lubricant supplying unit due to interference of the first and second fixed electrodes. Therefore, after the above-described determination of the detecting circuit 183, the solid lubricant held by the solid lubricant holding unit 143 is neither moved nor shaved by the solid lubricant supplying unit. In other words, after the determination of less than the given level of a residual quantity of the solid lubricant, the solid lubricant is not consumed any more.

Because errors occur in assembling these first and second fixed electrodes 181 and 182, it is difficult for the above-described conventional residual solid lubricant quantity detecting unit to detect when the solid lubricant is about to run out (herein also referred to as a terminal stage). Accordingly, the conventional gauges are generally designed to detect a stage earlier than the terminal stage (herein also referred to as a near end stage) at which the solid lubricant is not completely spent. Accordingly, when the residual solid lubricant quantity-detecting unit detects the residual quantity of the solid lubricant at the terminal stage, the solid lubricant is not completely spent. Consequently, the lubricant is partially wasted when replaced at this stage. At the same time, the images are sometimes continue to be formed even after the near end stage is detected but before the solid lubricant is subsequently replaced with a new solid lubricant, in which case the photoconductor may be damaged due to insufficient lubrication.

SUMMARY

Accordingly, one aspect of the present invention provides a novel solid lubricant supply system that comprises: a solid lubricant; a solid lubricant supplier to receive the solid lubricant and supply the solid lubricant to a solid lubricant supplying target; a first moveable planar electrode; and a second moveable planar electrode opposed to the first moveable planar electrode. The second moveable planar electrode is moved toward the first moveable planar electrode as the solid lubricant is consumed. At least one residual solid lubricant quantity detecting unit is provided to detect a quantity of the residual solid lubricant. The residual solid lubricant quantity detecting unit detects a first stage, in which the residual solid lubricant quantity is below a given level, by detecting electric conduction between the first moveable planar electrode and the second moveable planar electrode when the first moveable planar electrode and the second moveable planar electrode contact each other. The first moveable planar electrode is enabled to move together with the second moveable planar electrode while contacting the second moveable planar electrode when the second moveable planar electrode is further moved after the residual solid lubricant quantity detecting unit detects the first stage.

Another aspect of the present invention provides a novel image forming apparatus that comprises: an image bearer to bear a first image; a transfer unit to transfer the first image borne on the image bearer onto a recording medium to form a second image on the recording medium; and a solid lubricant supply system to supply a solid lubricant to a surface of the image bearer. The solid lubricant supply system comprises: a solid lubricant; a solid lubricant supplier to receive the solid lubricant and supply the solid lubricant to a solid lubricant supplying target; a first moveable planar electrode; and a second moveable planar electrode opposed to the first moveable planar electrode. The second moveable planar electrode is moved toward the first moveable planar electrode as the solid lubricant is consumed. At least one residual solid lubricant quantity detecting unit is provided to detect a quantity of the residual solid lubricant. The residual solid lubricant quantity detecting unit detects a first stage, in which the residual solid lubricant quantity is below a given level, by detecting electric conduction between the first moveable planar electrode and the second moveable planar electrode when the first moveable planar electrode and the second moveable planar electrode contact each other. The first moveable planar electrode is enabled to move together with the second moveable planar electrode while contacting the second moveable planar electrode when the second moveable planar electrode is further moved after the residual solid lubricant quantity detecting unit detects the first stage.

Yet another aspect of the present invention provides a novel process cartridge detachably attached to an image forming apparatus that comprises: an image bearer to bear a first image; a transfer unit to transfer the first image borne on the image bearer onto a recording medium to form a second image on the recording medium; and a solid lubricant supply system to supply a solid lubricant to a surface of the image bearer. The solid lubricant supply system comprises: a solid lubricant; a solid lubricant supplier to receive the solid lubricant and supply the solid lubricant to a solid lubricant supplying target; a first moveable planar electrode; and a second moveable planar electrode opposed to the first moveable planar electrode. The second moveable planar electrode is moved toward the first moveable planar electrode as the solid lubricant is consumed. At least one residual solid lubricant quantity detecting unit is provided to detect a quantity of the residual solid lubricant. The residual solid lubricant quantity detecting unit detects a first stage, in which the residual solid lubricant quantity is below a given level, by detecting electric conduction between the first moveable planar electrode and the second moveable planar electrode when the first moveable planar electrode and the second moveable planar electrode contact each other. The first moveable planar electrode is enabled to move together with the second moveable planar electrode while contacting the second moveable planar electrode when the second moveable planar electrode is further moved after the residual solid lubricant quantity detecting unit detects the first stage.

BRIEF DESCRIPTION OF THE DRAWINGS

A more complete appreciation of the present invention and many of the attendant advantages thereof will be more readily obtained as substantially the same becomes better understood by reference to the following detailed description when considered in connection with the accompanying drawings, wherein:

FIG. 7 is a diagram schematically illustrating a configuration of one longitudinal end of the solid lubricant supply system according to one embodiment of the present invention;

FIG. 8A is a diagram illustrating an contact state of the first and second moveable planar electrode contacting each other when usage of the solid lubricant enters near the terminal stage according to one embodiment of the present invention;

FIG. 8B is a diagram illustrating an contact state of the first and second moveable planar electrode when usage of the solid lubricant enters the terminal stage according to one embodiment of the present invention;

FIG. 14 is a diagram schematically illustrating a configuration of one longitudinal end of the solid lubricant supply system according to a third modification of the present invention;

FIG. 15A is a diagram illustrating a condition of the first moveable planar electrode and the second moveable planar electrode of the solid lubricant supply system in early usage stage of usage of the solid lubricant according to the third modification of the present invention;

FIG. 15B is a diagram illustrating a condition of the first moveable planar electrode and the second moveable planar electrode of the solid lubricant supply system in the terminal stage of usage of the solid lubricant according to the third modification of the present invention;

DETAILED DESCRIPTION

Figure 1:
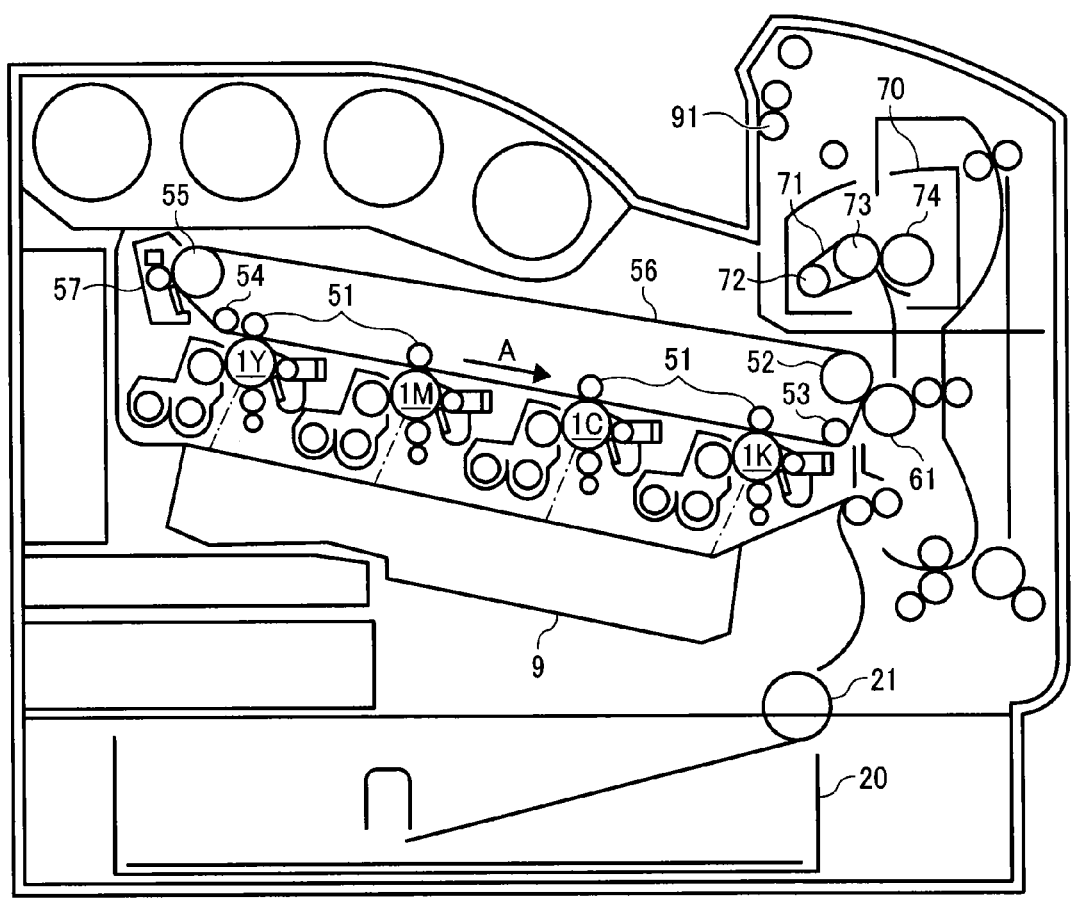
FIG. 1 is a diagram schematically illustrating a configuration of a printer according to one embodiment of the present invention.

Referring now to the drawings, wherein like reference numerals designate identical or corresponding parts throughout the several views thereof and in particular to FIG. 1, a printer as an image forming apparatus that employs electrophotography according to one embodiment of the present invention is described. This printer accommodates an intermediate transfer belt 56 (i.e., an intermediate transfer member) in its interior center as an image bearer. The intermediate transfer belt 56 is endless and is made of heat-resistant material, such as polyimide, polyamide, etc. The intermediate transfer belt 56 is composed of a substrate having a medium resistance. The intermediate transfer belt 56 is wound around and supported by four rollers 52, 53, 54 and 55 thereby driven and pivoted in a direction shown by arrow A. Below the intermediate transfer belt 56, four image forming units line up corresponding to yellow (Y), magenta (M), cyan (C), and black (K) toner particles, respectively, along a belt surface of the intermediate transfer belt 56.

Figure 2:
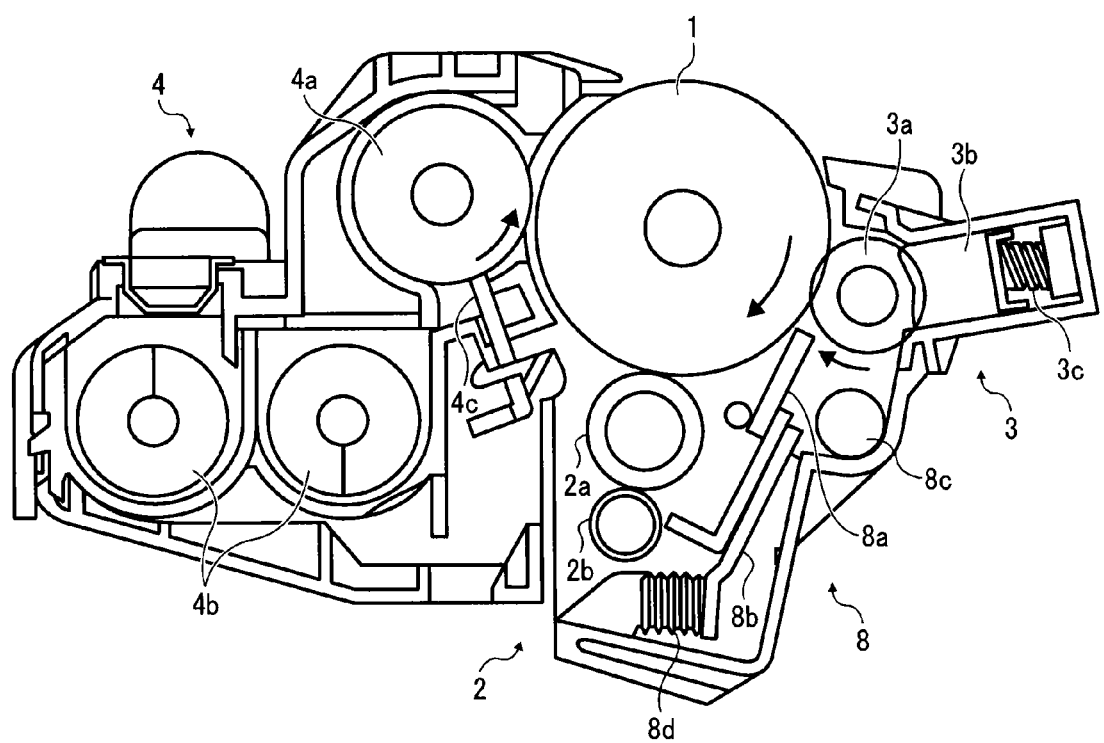
FIG. 2 is an expansion view illustrating one of four image forming units according to one embodiment of the present invention.

FIG. 2 is an enlarged view illustrating one of the four image forming units. Since configurations of the respective image forming units are substantially the same with each other, subscripts Y, M, C, and K indicating color distinction are omitted here. Each of the image forming units has a photoconductor 1 as an image bearer, an electricity charging unit 2 uniformly electrically charges a surface of the photoconductor 1 with an electricity charging roller 2a so that a desired electric potential (e.g., a negative polarity) is generated thereon. Each of the image forming units further includes a developing unit 4 that renders an electrostatic latent image formed on the surface of the photoconductor 1 visible as a toner image with toner particles of respective colors, each of which charged in a negative polarity (i.e., develops a latent image), and a solid lubricant supply system 3 that supplies and coats the surface of the photoconductor 1 with solid lubricant 3b. Each of the image forming units also includes a cleaning unit 8 that cleans the surface of the photoconductor 1 after the toner image is transferred therefrom. In each of the image forming units, the above-described solid lubricant supplying units are placed around the photoconductor 1.

The image forming unit is configured as a process cartridge attachably detachable from the image forming apparatus, so that the photoconductor 1, the electric charge supplying unit 2, the developing unit 4, the cleaning unit 8, and the solid lubricant supply system 3 can be replaced with a new process cartridge at once.

As shown in FIG. 1, below the four image forming units, an exposing unit 9 is provided to emit light based on image data of respective colors and exposes the surfaces of the photoconductors 1 which bear the electric charges to the light and reduce potentials of exposed portions thereof thereby writing electrostatic latent images thereon, respectively. Multiple primary transfer rollers 51 are also positioned facing the photoconductors 1, respectively, across the intermediate transfer belt 56 to primarily transfer the toner images formed on the photoconductors 1 onto the intermediate transfer belt 56. Each of the primary transfer rollers 51 is connected to a power source, not shown, so that a given amount of voltage is applied thereto.

Against a portion of an outer surface of the intermediate transfer belt 56 opposed to a supporting roller 52, a secondary transfer roller 61 is pressed as a secondary transfer unit. The secondary transfer roller 61 is also connected to a power source, not shown, so that a given amount of voltage is applied thereto. A contact between the secondary transfer roller 61 and the intermediate transfer belt 56 serves as a secondary transfer section, in which the toner image borne on the intermediate transfer belt is transferred onto a transfer sheet as a recording medium. Outside a portion of the intermediate transfer belt 56 opposed to a supporting roller 55, an intermediate transfer belt cleaning unit 57 is provided to clean the surface of the intermediate transfer belt 56 after the secondary transfer process is performed. Above the secondary transfer section, there is provided a fixing device 70 that fixes the toner image onto the transfer sheet. The fixing device 70 is configured by a heating roller 72 having a heater therein, a fixing roller 73, an endless fixing belt 71 wound around the heating roller 72 and the fixing roller 73, and a pressure roller 74 opposed and pressed against the fixing roller 73 across the fixing belt 71. The transfer sheet with the fixed toner image is ejected from an image forming apparatus by a pair of sheet ejecting rollers 91. At the bottom of the printer, there is also provided a sheet feeding system 20 to place and feed transfer sheets with a sheet feeding roller 21 toward the secondary transfer section of the secondary transfer roller 61.

Here, the photoconductor 1 is an organic type and includes a surface protection layer made of polycarbonate resin. The electric charge supplying unit 2 includes an electricity charging roller 2a configured by a conductive metal core acting as an electricity charging member and an elastic layer overlying the conductive metal core while having a medium resistance. The electricity charging roller 2a is connected to a power source, not shown, so that a given amount of voltage is applied thereto. The electricity charging roller 2a is opposed to the photoconductor 1 across a small gap. This small gap can be set by winding spacers with constant thicknesses onto non-image formation areas at both ends of the electricity charging roller 2a, respectively, while bringing the surface of the spacer in the contact with the photoconductor 1. An electric charge-cleaning member 2b is also provided to contact and clean a surface of the electricity charging roller 2a.

In the developing unit 4, a developing sleeve 4a having a magnetic field generating unit is provided as a developer bearer facing the photoconductor 1. Below the developing sleeve 4a, there is provided a pair of screws 4b which collectively mixes and pumps up (i.e., lifts) toner supplied from toner bottle, not shown, together with developer to the developing sleeve 4a while stirring them. The developer composed of the toner and magnetic carrier particles pumped up by the developing sleeve 4a in this way is borne on the developing sleeve 4a while regulated or smoothened by a so-called doctor blade 4c to have a given thickness. The developing sleeve 4a moves in the same direction as the photoconductor 1 at an opposed position to the photoconductor 1 and supplies the toner onto an electrostatic latent image borne at the time on the photoconductor 1 while bearing and conveying the developer. Although the developing unit 4 employing the two component developing system is described heretofore with reference to FIG. 1, the developing unit 4 is not limited to this type of the system and can employ a single-component developing system as well.

A solid lubricant supply system 3 has a fixed case, solid lubricant 3b housed in the fixed case, and a coating roller 3a acting as a solid lubricant supplying unit that coats the surface of the photoconductor 1 with powder-like solid lubricant by shaving it off from the solid lubricant 3b. The coating roller 3a may be either a brush type or a polyurethane-foam type. When the brush type is used as the coating roller 3a, the brush type is preferably made of material prepared by adding resistance control material such as carbon black, etc., to resin, such as a nylon, acrylic resin, etc., to have a volume resistivity adjusted within the range of from about $1 \times 10^3$ Ωcm or more to about $1 \times 10^8$ Ωcm or less. The coating roller 3a may rotate in an opposite direction to that of the photoconductor 1. Specifically, in a contact part between the photoconductor 1 and the coating roller 3a, a surface movement direction of the photoconductor 1 is opposite to that of the coating roller 3a. Whereas, when the urethane foam type is used as the coating roller 3a, a foam-polyurethane type may be used.

The solid lubricant 3b has a rectangular parallelepiped shape and is pressed against the coating roller 3a by the later described pressing mechanism 3c. The solid lubricant 3b may at least contain metal salts of fatty acid. For example, the metal salts of fatty acids may be fatty acid metal salts having a lamellar crystalline structure, such as fluorine resin, zinc stearate, calcium stearate, stearic acid barium, aluminum stearate, magnesium stearate, etc. Otherwise, lauroyl lysine, monocetyl phosphate esters of sodium zinc, and calcium lauroyl taurate or the like can be also used as well. This is because, the stearic acid zinc shows an excellent distensibility or extensibility on the surface of the photoconductor 1 and has low moisture absorption. Further because, even if humidity changes, the stearic acid zinc rarely loses its lubricity characteristics. Hence, since a film-shaped protective layer composed of the solid lubricant having high-ability of protecting the surface of the photoconductor 1 is formed and is rarely influenced by a change in environment, the surface of the photoconductor 1 can be precisely protected. Since the lubricity properties are rarely undermined, a chance of defective cleaning can be minimized. Beside the above-described fatty acid metal salts, liquid member, such as silicone oil, fluorinated oils, natural wax, etc., and gas can be also added as external additives. Out of these fatty acid metal salts, zinc stearate is especially preferable.

Here, the solid lubricant 3b preferably contains boron nitride acting as an organic solid lubricant. As the crystal structure of the boron nitride, a low pressure phase of a hexagonal crystal system (h-BN) and a high pressure phase of a cubic crystal system (c-BN) or the like are exemplified. Out of the boron nitride having these structures, because the boron nitride of the low pressure phase of a hexagonal crystals system has a layered structure and easily cleave, a friction coefficient can be maintained to be about 0.2 or less up to approx. 400° C. In addition, its characteristics are rarely changed even when it is subjected to the electric discharging process, and accordingly the lubricity less deteriorates than the other solid lubricant. Due to the addition of such boron nitride, the solid lubricant supplied to form a thin film on the surface of the photoconductor 1 does not quickly deteriorates even it is subjected to the electric discharging processes executed by the electricity charging unit 2 and the primary transfer roller 51. Since the boron nitride rarely changes its characteristics even receiving the electric discharge, its lubricity less deteriorates than the other solid lubricant. Moreover, due to addition of such boron nitride, a photosensitive layer of the photoconductor 1 can be prevented from oxidation and evaporation generally caused by the electric discharge. Since even a small quantity of the boron nitride can provide sufficient lubricity, it can effectively resolve a problem of adhesion of the solid lubricant to the electricity charging roller 2a or that of generation of strange sound by a cleaning blade 8a.

The solid lubricant 3b of this embodiment is made of raw material of solid lubricant containing zinc stearate and boron nitride and is prepared by a compression-molding process. A molding method to mold the solid lubricant 3b is not limited to the compression molding, and the other molding method such as a molten molding method, etc., may be also employed as well. Hence, the above-described both of advantages of the zinc stearate and the boron nitride can be obtained as well at the same time.

Although the solid lubricant 3b is shaved off and is consumed by the coating roller 3a thereby reducing its thickness, it is always pressed against the coating roller 3a by the pressing mechanism 3c. The coating roller 3a applies the shaved off solid lubricant to the surface of the photosensitive while rotating. Subsequently, the coated solid lubricant is spread out to be a thin film in a contact part between the surface of the photoconductor 1 and the surface of the cleaning blade 8a. This reduces the friction coefficient of the surface of the photoconductor 1. Since the solid lubricant film formed on the surface of the photoconductor 1 adhering thereto is very thin, the electricity charging process executed by the electricity charging roller 2a is not substantially interfered.

The cleaning unit 8 includes a cleaning blade 8a, a supporting member 8b, a toner recovery coil 8c, and a cleaning blade pressing spring 8d or the like. The cleaning blade 8a is made of rubber, such as urethane, silicone, etc., and is formed into a plate like state. The cleaning blade 8a is disposed with its edge engaging with the surface of the photoconductor 1 to remove residual toner remaining thereon after a transferring process therefrom. The cleaning blade 8a is adhered to and supported by the supporting member 8b made of metal, plastic, ceramic, etc., while making a given angle with the surface of the photoconductor 1. The cleaning blade 8a may be pressed against the surface of the photoconductor 1 by a blade pressing spring 8d with given pressure and invading amount. A known cleaning member such as cleaning brush, etc., can be also utilized other than the cleaning blade 8a as well.

Here, in this embodiment, the solid lubricant supply system 3 is placed downstream of a position, at which the photoconductor 1 is opposed to a primary transfer device composed of multiple primary transfer rollers 51 (i.e., a primary transfer section) and upstream of a position, at which the photoconductor 1 is opposed to the cleaning unit 8, in a surface moving direction of the photoconductor 1. With this, the solid lubricant coated by the solid lubricant supply system 3 onto the surface of the photoconductor 1 is extended by the cleaning blade 8a as it slides on the surface of the photoconductor 1, thereby capable of roughly smoothening the uneven solid lubricant thereon. Otherwise, the solid lubricant supply system 3 can be placed downstream of a position, at which the photoconductor 1 faces the cleaning unit 8 (i.e., a cleaning position), and upstream of a position, at which the photoconductor 1 faces the electricity charging unit 2 (i.e., an electricity charging position), in the surface moving direction of the photoconductor 1 as well. In such a situation, when the electric charge removing device is disposed upstream of the electricity charging unit 2 to remove electric charge remaining on the surface of the photoconductor 1, the solid lubricant supply system 3 may be placed upstream of a position, at which the photoconductor 1 faces the electric charge removing device (i.e., an electric charge removing position). Here, in this embodiment, the solid lubricant supply system 3 is disposed in an interior of the cleaning unit 8. With this, toner adhering to the coating roller 3a when the coating roller 3a slides on the surface of the photoconductor 1 is shaken off by either the solid lubricant 3b or a flicker, not shown. Subsequently, the toner shaken off the coating roller 3a can be easily collected by a toner recovery coil 8c together with the other toner collected by the cleaning blade 8a from the surface of the photoconductor 1 as well.

Figure 3:
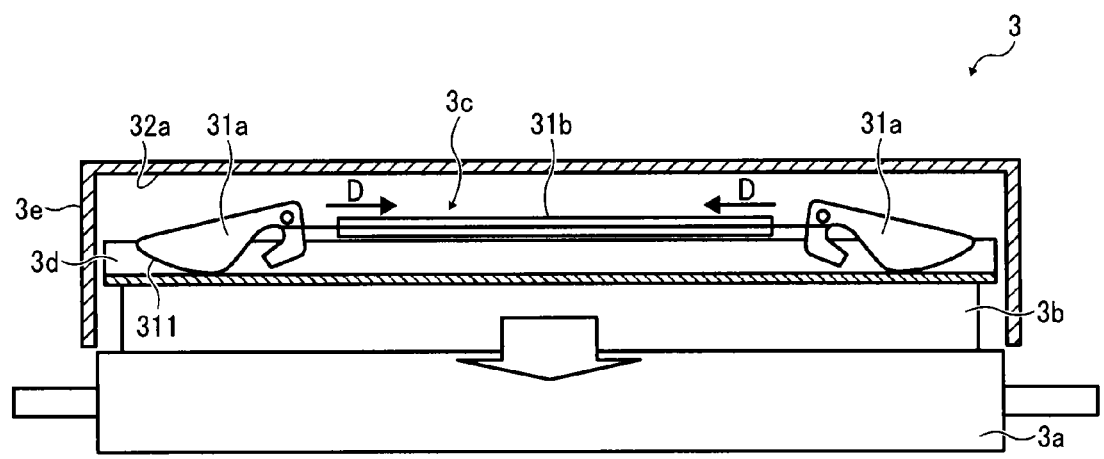
FIG. 3 is a diagram schematically illustrating a configuration of a solid lubricant supply system according to one embodiment of the present invention.

Now, the solid lubricant supply system 3 is described more in detail with reference to FIG. 3 that schematically illustrates a configuration of the solid lubricant supply system 3. As shown in FIG. 3, a solid lubricant holding unit 3d is provided to entirely hold one longitudinal side of the solid lubricant 3b, which does not contact the coating roller 3a (i.e., an upper side in the drawing). The solid lubricant holding unit 3d is detachably attached to a storage case 3e to be able to contact and separate from the coating roller 3a. A compression spring is also provided above the solid lubricant holding unit 3d in the storage case 3e as a pressing mechanism 3c to press the solid lubricant 3b against the solid lubricant supplying unit (i.e., the coating roller 3a). The solid lubricant holding unit 3d is accordingly pressed against the coating roller 3a by the pressing spring 31d.

The pressing mechanism 3c includes a pair of pivoting members 31a pivotally attached to near both longitudinal ends of the solid lubricant holding unit 3d in the storage case 3e, respectively, and a spring 31b as a biasing member. Both of the ends of the spring 31b are connected to the pivoting members 31a, respectively. Each of the pivoting members 31a obtains a biasing force longitudinally directed toward a center of the spring 31b of the solid lubricant holding member from the spring 31b as shown by arrow D in the drawing. By this biasing force, the pivoting member 31a on the right side in the drawing is biased to pivot counterclockwise in the drawing, while the pivoting member on the left side in the drawing is biased to pivot clockwise by contrast. A pair of symmetrical arc-shaped contacting sections 311 of the respective pivoting members 31a is biased toward the solid lubricant holding unit 3d while engaging therewith as shown in FIG. 3.

At an early stage of usage of the solid lubricant, each of pivoting ends of the pivoting members 31a approaches an inner upper surface 32a of the storage case 3e while resisting the biasing force of the spring 31b. With this configuration, these two pivoting members 31a collectively depress the solid lubricant holding unit 3d with substantially the same force while receiving the biasing force from the spring 31b, so that the solid lubricant 3b held by the solid lubricant holding unit 3d can be pressed against the coating roller 3a. Accordingly, the solid lubricant 3b is uniformly pressed against the coating roller 3a along its longitudinal direction. Thus, a quantity of solid lubricant scraped off by the sliding friction caused by rotation of the coating roller 3a and supplied to the surface of the photoconductor 1 can be substantially equivalent along the longitudinal direction.

Figure 4:
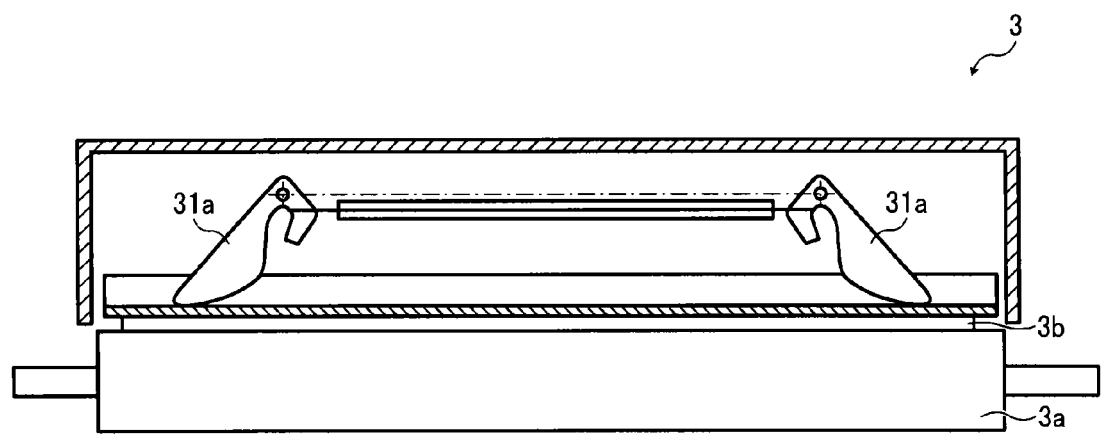
FIG. 4 is a diagram schematically illustrating a configuration of the solid lubricant supply system when usage of solid lubricant enters the terminal stage according to one embodiment of the present invention.

FIG. 4 is a diagram schematically illustrating a condition of the solid lubricant supply system 3 at a terminal stage of usage of the solid lubricant (i.e., when the solid lubricant scarcely remains). Specifically, when the solid lubricant 3b is gradually scraped off by the sliding friction of the coating roller 3a, the pivoting members 31a pivots and accordingly the solid lubricant holding unit 3d moves toward the coating roller. Subsequently, as shown in FIG. 4, when only a slight quantity of solid lubricant ultimately remains, the pivoting ends of the respective pivoting members 31a contact the solid lubricant holding unit 3d.

With the pressing mechanism 3c of this embodiment, even though a height of the solid lubricant 3b decreases as is chronologically used, a decrease in pressure applied to the solid lubricant 3b can be likely suppressed. As a result, a variation in quantity of solid lubricant supplied to the surface of the photoconductor 1 in a powder state can be minimized during chronological usage from an early stage for the reasons as described below more in detail.

That is, in general, when compared with a variation in extension of a spring generated from an early stage to the last stage of usage of the solid lubricant 3b (i.e., until the solid lubricant 3b disappears), a variation in biasing force of the spring can be relatively minimized in proportion to the overall length of the spring. In a conventional pressing mechanism, the spring is placed in a compressed state, and a direction of the biasing force (i.e., an extruding force) is equalized with a pressing direction in which the solid lubricant 3b is pressed against the coating roller 3a. However, with such a configuration, since the longer the spring, the more difficult to equalize the pressing direction of the solid lubricant 3b toward the coating roller 3a with the direction of the biasing force of the spring, there is a limit on the whole length of the spring. In addition, in the conventional pressing mechanism, since a space must be a radially provided corresponding to the length of the spring from a central axis of the coating roller 3a to arrange the spring, an apparatus is necessarily up-sized. For these reasons, in the conventional pressing mechanism, since a relatively short spring needs to be used, a variation of the biasing force necessarily grows chronologically.

By contrast, as shown in FIG. 3, in the pressing mechanism 3c of this embodiment, since the spring 31b is placed in an extended state, the solid lubricant 3b can be pressed against the coating roller 3a by its biasing force (i.e., pulling force). Therefore, even if the spring is elongated, the above-described problem arisen in the conventional pressing mechanism is not raised. Moreover, in the pressing mechanism 3c of this embodiment, the spring 31b is placed with its longitudinal direction matching with that of the solid lubricant 3b, specifically in an axial direction of the coating roller 3a. Therefore, since the deployment space for it does not radially spread from the central axis of the coating roller 3a even if the spring 31b is elongated, the pressing mechanism 3c is not necessarily upsized. For this reason, the pressing mechanism 3c of this embodiment can use much longer spring 31b than that employed in the conventional pressing mechanism. As a result, a chronological variation in biasing force of the spring 31b can be minimized, accordingly.

Now, a first modification of the pressing mechanism 3c is described with reference to FIG. 5, which schematically illustrates a solid lubricant supply system according to another embodiment of the present invention. This modified pressing mechanism 300c is configured by freely pivotally attaching a pair of pivoting members 301a to the solid lubricant holding unit 3d. As a result, since it is biased by a biasing force of a spring 301b directed toward the longitudinal center of the solid lubricant holding unit 3d, a pair of pivoting ends of the respective pivoting members 301a separates from the solid lubricant holding unit 3d, and contacts an inner upper surface 32 of the storage case 3e.

Figure 5:
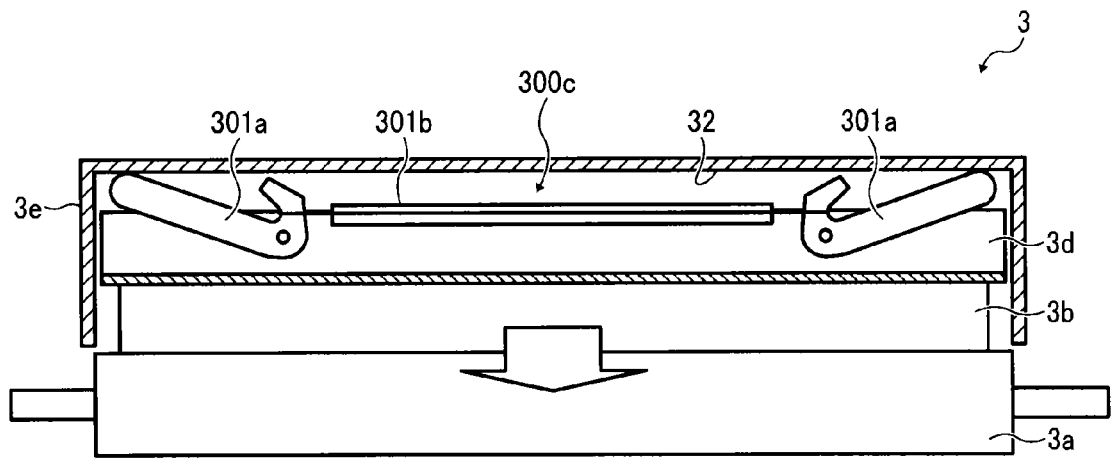
FIG. 5 is a schematic block diagram illustrating the solid lubricant supply system with a modified pressing mechanism according to one embodiment of the present invention.
Figure 6:
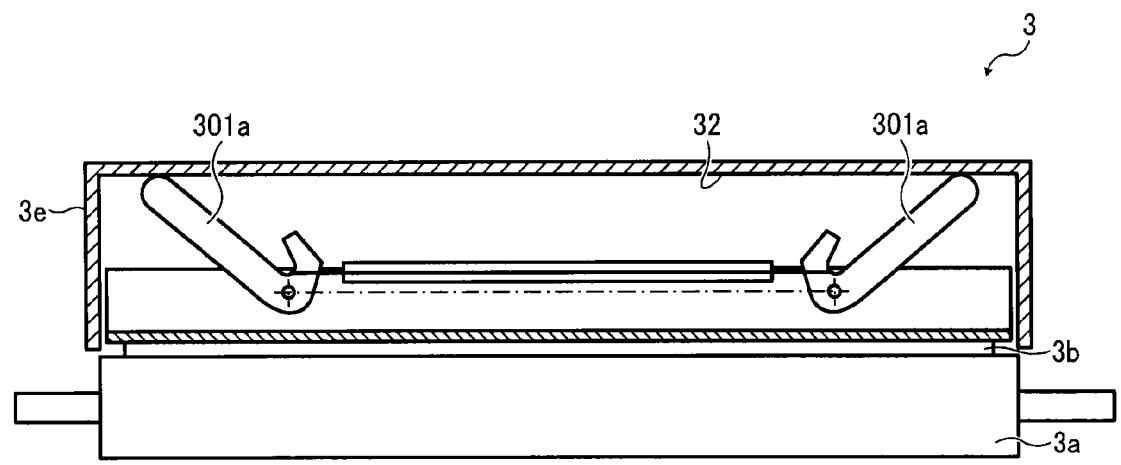
FIG. 6 is a diagram schematically illustrating the solid lubricant supply system shown in FIG. 5 when usage of solid lubricant enters the terminal stage according to one embodiment of the present invention.

As shown in FIG. 5, in an early usage stage, the pivoting ends of the respective pivoting members 301a are placed to approximate to the solid lubricant holding unit 3d while resisting the biasing force of the spring 301b. In this first modification of the present invention, upon receiving the biasing force from the spring 301b the pair of pivoting members 301a presses against the inner upper surface 32 of the storage case 3e with equivalent forces, and accordingly press the solid lubricant 3b held by the solid lubricant holding unit 3d against the coating roller 3a. Again in this modification of the present invention, when the solid lubricant 3b is gradually scraped off by the sliding friction of the coating roller 3a, the pivoting members 301a pivot and accordingly the solid lubricant holding unit 3d moves toward the coating roller 3a. Subsequently, when only a small quantity of solid lubricant remains eventually, the respective pivoting members 301a pivot up to a state as shown in FIG. 6.

Now, a residual solid lubricant quantity detecting unit 40 acting as a residual solid lubricant quantity detecting unit that detects the near end of the solid lubricant is described as one of features of this embodiment with reference to FIG. 7. FIG. 7 schematically illustrates a longitudinal one end of the solid lubricant supply system 3. The other longitudinal end of the solid lubricant supply system 3a has the similar configuration as the above-described one end as well. As shown in FIG. 7, the residual solid lubricant quantity detecting unit 40 as a residual solid lubricant quantity detecting unit is provided at near both longitudinal ends of the solid lubricant 3b, respectively. The residual solid lubricant quantity detecting unit 40 is disposed on a side surface of beside the storage case 3e. The residual solid lubricant quantity detecting unit 40 includes a first moveable planar electrode 42a, a second moveable planar electrode 42b opposed to the first moveable planar electrode 42a, and a resistance detecting unit 42c or the like. The resistance detecting unit 42c is connected to the first and second moveable planar electrodes 42a and 42b, and applies a voltage therebetween to measure an electrical resistance. The resistance detecting unit 42c is also connected to a controlling unit 100. The first and second moveable planar electrodes 42a and 42b are positioned and held by a covering unit 43 that covers these moveable planar electrodes 42a and 42b.

The first and second moveable planar electrodes 42a and 42b each has a planar shape and is composed of an electrically conductive member, such as a sheet like metal plate, etc. Right side edges of the first and second moveable planar electrodes 42a and 42b in the drawing are fixed and held thereby cantilevered by the covering unit 43.

In addition, an opening 31e is formed in a side surface of the storage case 3e while extending in a direction in which the solid lubricant holding unit 3d moves. Through the opening 31e, a pressing unit 31d provided in the solid lubricant holding unit 3d penetrates.

In the early usage stage, the pressing unit 31d provided in the solid lubricant holding unit 3d is spaced from the second moveable planar electrode 42b. Therefore, in this moment, since the second moveable planar electrode 42b is spaced from the first moveable planar electrode 42a, electric current neither flows between these first and second moveable planar electrodes 42a and 42b nor the electrical resistance can be measured even if the resistance detecting unit 42c applies the voltage therebetween.

When the solid lubricant 3b is scraped off and is consumed thereby lowering its height, the solid lubricant holding unit 3d comes closer to the coating roller 3a. When the height of the solid lubricant 3b comes to a given values after that, the pressing unit 31d provided in the solid lubricant holding unit 3d contacts the second moveable planar electrode 42b. When the solid lubricant 3b is further scraped off while reducing the height thereof, the second moveable planar electrode 42b is pressed by the pressing unit 31d after the contact. Consequently, the second moveable planar electrode 42b is bent toward the first moveable planar electrode 42a. Subsequently, when only a small quantity of the solid lubricant remains (i.e., near the end thereof), a free edge of the second moveable planar electrode 42b contacts the first moveable planar electrode 42a as shown in FIG. 8A. When the second moveable planar electrode 42b contacts the first moveable planar electrode 42a, a non-conducting state of the first and second moveable planar electrodes 42a and 42b is switched to a conductive state thereof. With this, when the resistance detecting unit 42c applies a voltage between the first and second moveable planar electrodes 42a and 42b, a current flows therebetween. As a result, an electrical resistance can be measured by the resistance detecting unit 42c.

The controlling unit 100 monitors a measuring result of the resistance detecting unit 42c and determines that the solid lubricant comes to near the end when the resistance detecting unit 42c detects a given electrical resistance or less. Subsequently, the controlling unit 100 transmits alarm to an operation display unit, not shown, with messages that the solid lubricant scarcely remains and prompts the user to replace the old solid lubricant with a new solid lubricant. Otherwise, the controlling unit 100 can inform a service center that the solid lubricant needs to be replaced via a communications system, not shown.

Here, in general, a quantity of the solid lubricant supplied to the photoconductor 1 is not constant and is different depending on an area ratio of an image formed on the surface of the photoconductor 1 or the like. More specifically, when a toner image formed on the surface of the photoconductor 1 coated with the solid lubricant is transferred onto an intermediate transfer belt 56 in a primary transfer section, the solid lubricant on the surface of the photoconductor 1 is sometimes transferred onto the intermediate transfer belt together with the toner. Because of this, an image having a higher image area ratio reduces more quantity of solid lubricant than that having a lower image area ratio on the surface of the photoconductor 1. As a result, the image having a higher image area ratio necessitates a more quantity of solid lubricant to be supplied to the surface of the photoconductor 1. Because of this, a decreasing quantity of the solid lubricant per hour is different between a user who often outputs images having a low image area ratio such as character, etc., and the other user who often outputs images having a high image area ratio such as a photograph, etc. Therefore, when the near end is determined based only on an operating periods, such as a mileage of the coating roller 3a, etc., it is affected by various usage conditions and cannot be always accurately detected unlike in this embodiment. Specifically, when a given mileage of the coating roller 3a that corresponds to the near end of the solid lubricant when it is intensively used is used as a reference to determine if the solid lubricant is in the near end for a user who consumes a less quantity of the solid lubricant (i.e., who does not intensively use the solid lubricant), the user is forced to replace the old solid lubricant before the old solid lubricant is not used up. By contrast, a given mileage of the coating roller 3a that corresponds to the near end of the solid lubricant when it is rarely or not intensively used is used as a reference to determine if the solid lubricant is in the near end for a user who intensively use and consume the solid lubricant, it likely dries up before the near end is detected.

When the near end is detected by the residual solid lubricant quantity detecting unit 40 based on the height of the solid lubricant like in this embodiment, the near end can be more precisely detected regardless of a condition of usage than the above-described system, in which the near end is detected based on the mileage of the coating roller 3a. The residual solid lubricant quantity detecting unit 40 does not detect just the end of the solid lubricant right before the solid lubricant dries up, and detects a given quantity of solid lubricant to be able to further supply the same to the surface of the photoconductor 1 by a given number of times (i.e., the near end). Since a problem generally arises due to solid lubricant depletion when image forming operation is executed after the end of the solid lubricant is detected by the residual solid lubricant quantity detecting unit 40, the image formation needs to be prohibited until the solid lubricant is completed replaced resulting in downtime.

By contrast, in this embodiment, even if the residual solid lubricant quantity detecting unit 40 detects the near end of the solid lubricant and a given number of image forming operations is executed thereafter, the solid lubricant can be continuously supplied to the surface of the photoconductor 1 to help protect the surface of the photoconductor 1. This allows the image forming operation started from when the near end is detected to when a new solid lubricant is ready to replace and is actually replaced, so that the system can minimize the downtime. When the given number of image formation operations is executed until the new solid lubricant is ready to replace, the old solid lubricant may be exhausted resulting in a decline in the solid lubricant as a problem. Thus, when the residual solid lubricant quantity detecting unit 40 has detected the near end, either the mileage (i.e., a turnover number) of the coating roller 3a or the number of image forming operations is monitored. Specifically, when either a given mileage (i.e., the turnover number) of the coating roller 3a or a given number of image forming operations is reached, it is determined that the solid lubricant comes to the end and prohibits the image formation.

Hence, when the solid lubricant supplying operating is executed after the second moveable planar electrode 42b contacts the first moveable planar electrode 42a, and the near end is detected, the solid lubricant 3b is further consumed while further reducing its height. Subsequently, since the pressing unit 31d of the solid lubricant holding unit 3d further presses the second moveable planar electrode 42b toward the coating roller 3a, the second moveable electrode 42b further depresses the first moveable planar electrode 42a. Subsequently, as shown in FIG. 8B, the first moveable planar electrode 42a deforms and bends, so that a free end of the first moveable planar electrode 42a moves toward the coating roller 3a together with the second moveable planar electrode 42b. With this, even after the residual solid lubricant quantity detecting unit 40 detects the near end, the coating roller 3a can yet scrape and supply the solid lubricant 3b therefrom to the surface of the photoconductor 1.

In this embodiment, after the second moveable planar electrode 42b contacts the first moveable planar electrode 42a and the near end is detected, as the solid lubricant 3b is consumed (i.e., the solid lubricant holding unit 3d moves toward the coating roller 3a) the first moveable planar electrode 42a moves toward the coating roller 3a together with the second moveable planar electrode 42b.

Figure 17:
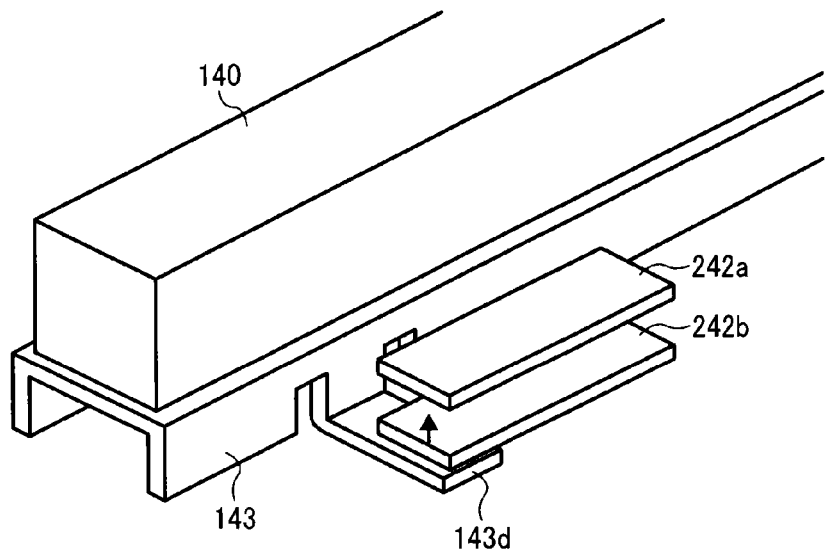
FIG. 17 is a diagram illustrating one example of a conventional solid lubricant supply system.
Figure 18A:
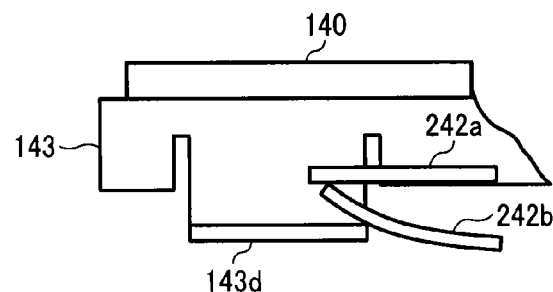
FIG. 18A is a diagram illustrating an aspect of fixed and moveable planar electrodes of a related art having the similar configuration as that of FIG. 17 when the solid lubricant enters the near end usage stage.
Figure 18B:
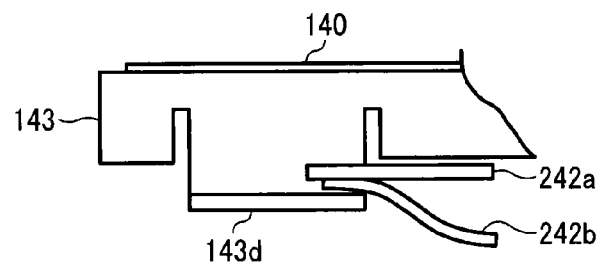
FIG. 18B is a diagram illustrating another aspect of the fixed and moveable planar electrodes of the related art when the solid lubricant enters the terminal usage stage.

Different from this embodiment, FIG. 17 illustrates a system, in which a first moveable planar electrode is fixed not to deflect and deform even if a moveable planar electrode 242b contacts. Specifically, in the system of FIG. 17, when a free end of a moveable planar electrode 242b contacts a fixed electrode 242a and accordingly the near end is detected as shown in FIG. 18A, the free end of the moveable planar electrode 242b now contacting the fixed electrode 242a cannot move any more. However, a portion of the moveable planar electrode 242b other than its free end can move toward the fixed electrode 242a because there exists a gap between the portion and the fixed electrode 242a. Accordingly, When solid lubricant supplying action is executed after the detection of the near end and accordingly the solid lubricant is consumed, the solid lubricant holding unit 143 moves toward a solid lubricant supplying unit, not shown, due to a biasing force of the spring, not shown, and accordingly, a pressing unit 143d can press the moveable planar electrode 242b toward the fixed electrode 242a. Subsequently, as shown in FIG. 18B, the portion of the moveable planar electrode 242b other than its free end elastically deforms as a result. With this, the solid lubricant holding unit 143 can move toward the solid lubricant supplying unit, not shown. Accordingly, by scraping off the solid lubricant 140 with the solid lubricant supplying unit, not shown, after the detection of the near end, the surface of the photoconductor 1 can be protected.

However, in the system of FIG. 17, as shown in FIG. 18B the moveable planar electrode 242b shows elastic deformation as if its both ends are fixed and supported (i.e., not cantilevered) after contacted as shown in FIG. 18A and further depressed by the free end of the moveable planar electrode 242b (i.e., after the detection of the near end) as shown in FIG. 18B. As a result, the larger force is needed by the pressing unit 143d to elastically deform the moveable planar electrode 242b than to elastically deform the cantilevered moveable planar electrode 242b, thereby generating a large reaction thereto. Therefore, pressing force to press the solid lubricant 140 against the solid lubricant supplying unit, not shown, may significantly decrease in the solid lubricant supplying operation executed after the detection of the near end. Consequently, in the solid lubricant supplying operation executed after the detection of the near end, a quantity of solid lubricant scraped off by the solid lubricant supplying unit, not shown, and supplied to the surface of the photoconductor 1 likely decrease, so that the surface of the photoconductor 1 cannot be precisely protected likely.

By contrast, in this embodiment, the first moveable planar electrode contacted by the second moveable planar electrode 42b is cantilevered and is enabled to move together with the second moveable planar electrode 42b when contacted by the free end of the second moveable planar electrode 42b and further depressed by the pressing unit 31d toward 2 the coating roller 3a. With this, growing of resilience (i.e., reaction) of the first moveable planar electrode contacted by the second moveable planar electrode 42b after the detection of the near end may be more reduced than a system, in which the fixed planar electrode type is utilized. With this, a decline in the contacting pressure of the solid lubricant 3b applied to the coating roller 3a after the detection of the near end may be likely avoided. As a result, a decline in the quantity of the solid lubricant supplied to the surface of the photoconductor 1 after the detection of the near end can be also likely avoided as well. As a result, even before the solid lubricant is ready to replace after the residual solid lubricant quantity detecting unit 40 detects the near end, the solid lubricant can be precisely supplied continuously while protecting the surface of the photoconductor 1.

In this embodiment, the second moveable planar electrode 42b is also cantilevered as well, and contacts the first moveable planar electrode 42a by elastically deflecting or bending by itself. With this, the system can be more effectively simplified than a system, in which the second moveable planar electrode 42 is entirely moveable.

Also, in this embodiment, until the solid lubricant becomes the near end, the first moveable planar electrode 42a and the second moveable planar electrode 42b are not electrically connected to each other (i.e., in a de-energized state), no current flows even though a voltage is applied between these first and second moveable planar electrodes 42a and 42b. Hence, since it is not consumed at every detection times for detecting the near end, the power can be saved. In addition, since the moveable planar electrodes 42a and 42b, which detect a remaining level of the solid lubricant, can be made of relatively inexpensive material such as sheet metal etc., the apparatus can be cost effective.

In addition, in this embodiment, the residual solid lubricant quantity detecting unit 40 is externally disposed outside the storage case 3e, the solid lubricant dispersed in a powder state can be likely inhibited to adhere to the first and second moveable planar electrodes 42a and 42b.

Also, in this embodiment, since the covering unit 43 covers the opening 31e and these first and second moveable planar electrodes 42a and 42b, the powder of the solid lubricant scattered to an outside of the solid lubricant supply system 3 from the opening 31e can be likely inhibited to dirty the apparatus. The scattered toner can be also inhibited to adhere to the first and second moveable planar electrodes 42a and 42b for the same reason, so that conductive failure generally arising between these first and second moveable planar electrodes 42a and 42b can be likely prevented.

In addition, in this embodiment, since the first and the second moveable planar electrodes 42a and 42b are positioned and held by the covering unit 43 as well, part tolerance can be minimized. Specifically, these first and the second moveable planar electrode 42a and 42b are positioned and held by the same member (i.e., the covering unit 43). With this, the first and second moveable electrodes 42a and 42b can be also precisely positioned with each other. Accordingly, when the solid lubricant 3b is in the near end, the second moveable planar electrode 42b can absolutely contact the first moveable planar electrode 42a, so that the near end of the solid lubricant can be precisely detected. In addition, by simply removing the covering unit 43 from the storage case 3e, the residual solid lubricant quantity detecting unit 40 can be readily removed from the solid lubricant supply system 3, and accordingly the residual solid lubricant quantity detecting unit 40 can be easily replaced as well.

In this embodiment, a pair of residual solid lubricant quantity detecting units 40 acting as residual solid lubricant quantity detecting units is provided near both longitudinal ends of the solid lubricant 3b, respectively. Accordingly, even when a consumption quantity of the solid lubricant 3b is different along its longitudinal direction, the residual solid lubricant quantity detecting unit 40 placed on one end, in which the consumption quantity of the solid lubricant is greater, can detect the near end when the one end of solid lubricant 3b comes to the near end. With this, a problem that the solid lubricant is depleted at a side, in which it is intensively consumed and cannot supply and protect thereby damaging the surface of the photoconductor 1 or the like can be likely prevented.

Figure 9:
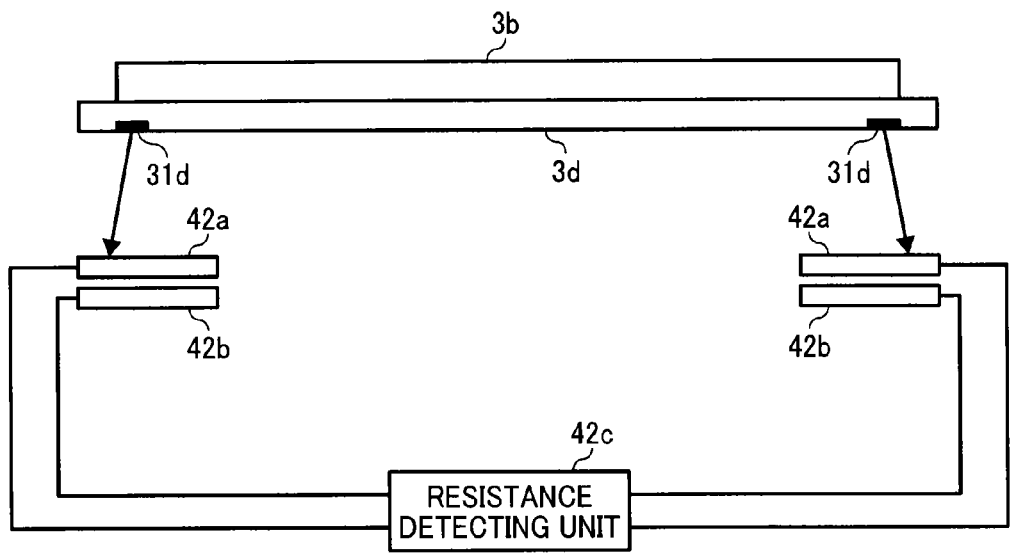
FIG. 9 is a diagram illustrating a system, in which a single resistance detecting unit is provided for the residual solid lubricant quantity detecting units according to one embodiment of the present invention.
Figure 10:
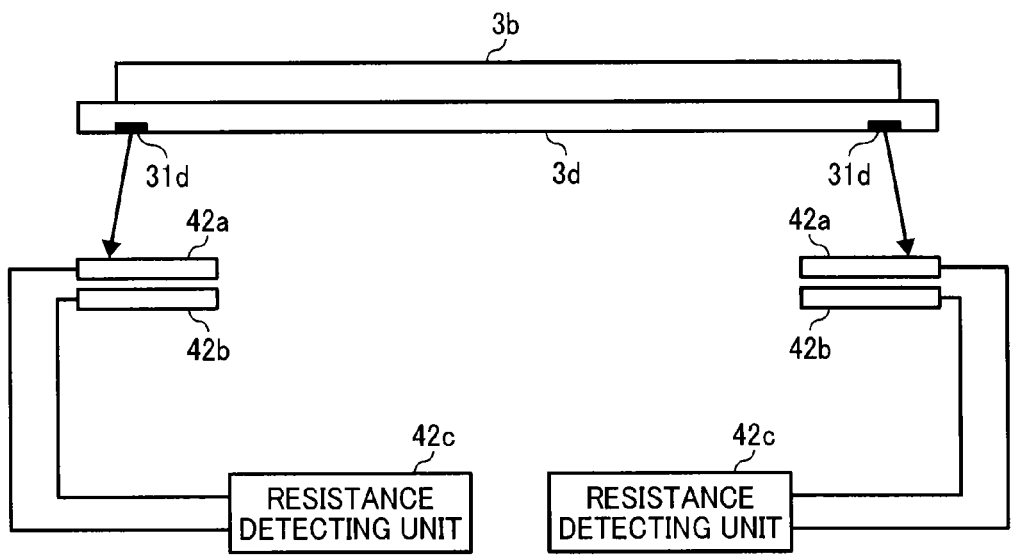
FIG. 10 is a diagram illustrating a system, in which multiple resistance detecting units are respectively established for the residual solid lubricant quantity detecting units according to one embodiment of the present invention.

Here, a common resistance detecting unit 42c can be provided for each of the residual solid lubricant quantity detecting units 40 as shown in FIG. 9. Otherwise, a pair of resistance detecting units 42c may be provided in the residual solid lubricant quantity detecting units 40, respectively, as shown in FIG. 10. When the pair of resistance detecting units 42c is provided in the respective residual solid lubricant quantity detecting units 40 as shown in FIG. 10, it can be recognized that which one of the longitudinal ends of the solid lubricant comes to the near end.

Figure 19A:
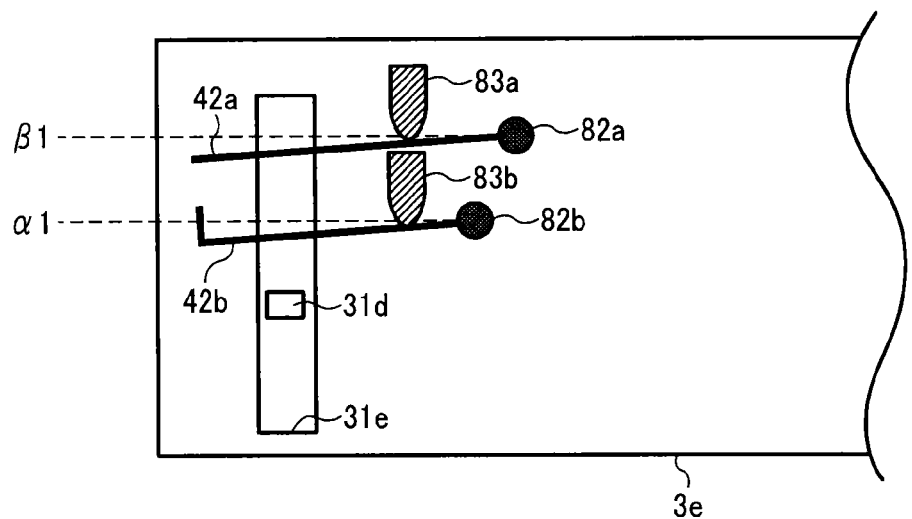
FIGS. 19A and 19B are diagrams collectively illustrating a system in which a regulatory member is omitted.
Figure 19B:
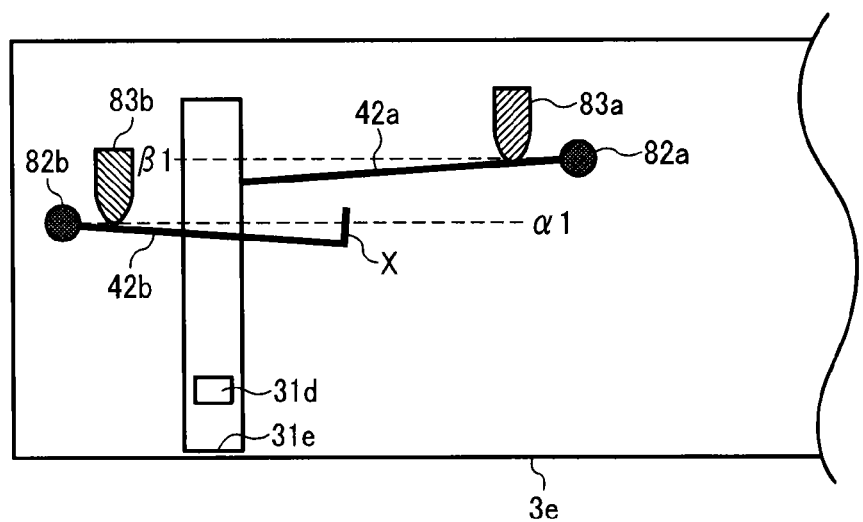
Figure 20A:
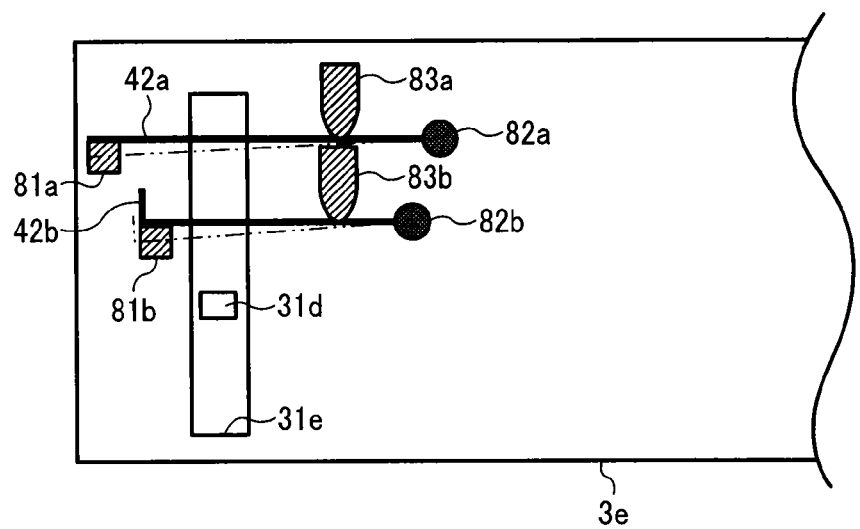
FIGS. 20A and 20B are diagrams collectively illustrating an aspect of a system, in which a regulatory member is provided to regulate an initial position of each of free ends of the respective moveable planar electrodes according to one embodiment of the present invention.
Figure 20B:
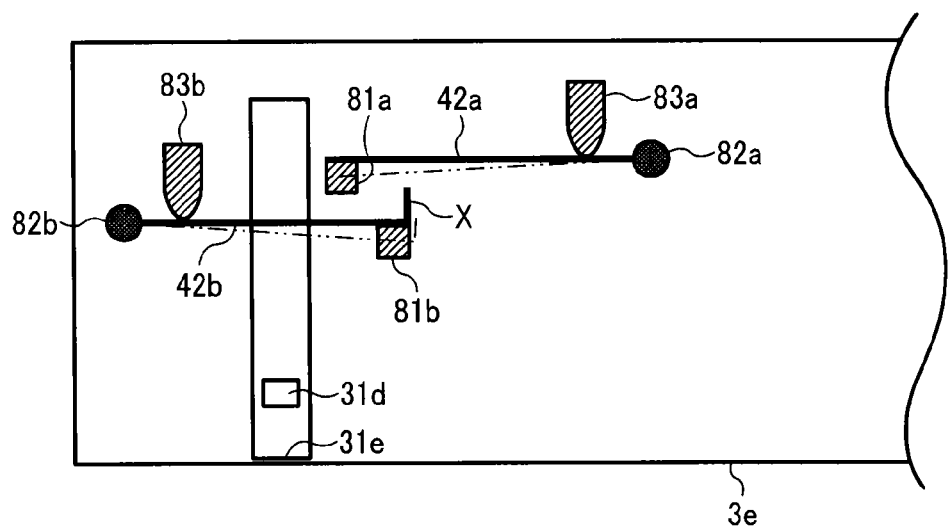

A pair of regulatory members may be desirably disposed to regulate initial positions of the respective free ends of the first and second moveable planar electrodes 42a and 42b as shown in FIGS. 20A and 20B. By contrast, FIGS. 19A and 19B collectively illustrate a system, in which regulatory member is not provided. Specifically, FIG. 19A illustrates an example, in which respective right ends of the first and second moveable planar electrodes 42a and 42b in the drawing are fixed to the covering unit 43. FIG. 19B illustrates another example, in which a right end of the first moveable planar electrode 42a in the drawing and a left end of the second moveable planar electrode 42b in the drawing are fixed to the covering unit 43. Here, reference numbers 82a and 82b indicate fixed portions of these moveable planar first and second moveable planar electrodes 42a and 42b, respectively. In addition, reference numbers 83a and 83b indicate fulcrums of these first and second moveable planar electrodes 42a and 42b, respectively.

As shown in FIG. 19, when the initial positions of the respective free ends of the first and second moveable planar electrodes 42a and 42b are not regulated, the first and second moveable planar electrodes 42a and 42b incline from original mounting orientations defined by dashed lines α1 and β1 in the drawing due to inaccuracy of parts and assembly error of the first and second moveable planar electrodes 42a and 42b. As a result, a detected remaining quantity of the solid lubricant accordingly varies. As described earlier, even after the detection of a remaining quantity of solid lubricant with the moveable planar electrodes 42a and 42b, image forming operation is executed in this embodiment until a predetermined mileage has been reached or the given number of image formations is executed. Therefore, when the remaining quantity of the solid lubricant detected by the moveable planar electrodes 42a and 42b varies, the solid lubricant has dried up before either the predetermined mileage has been reached or the given number of image formations has been executed resulting in damaging the photoconductor 1 as a problem.

Figure 21A:
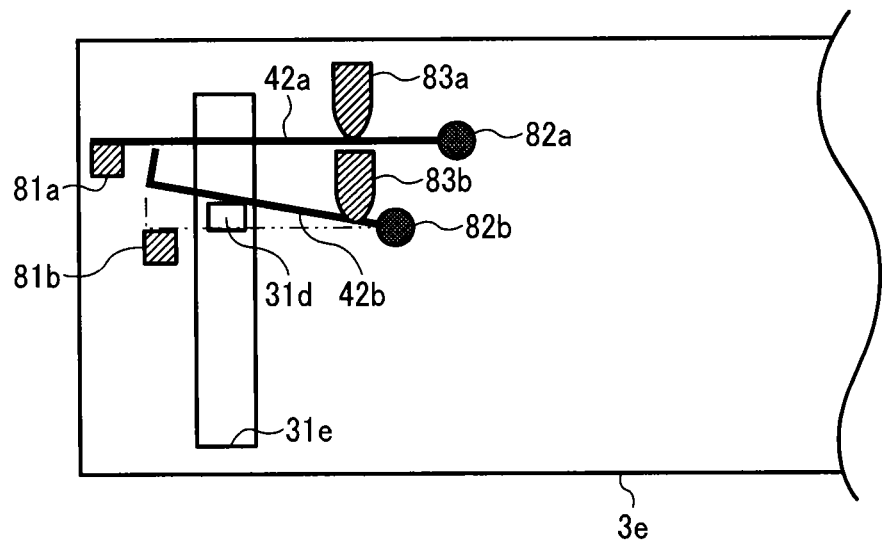
FIGS. 21A and 21B are diagrams collectively illustrating an aspect when a residual solid lubricant quantity detecting unit detects the solid lubricant near end stage in the system with the regulatory member according to one embodiment of the present invention.
Figure 21B:
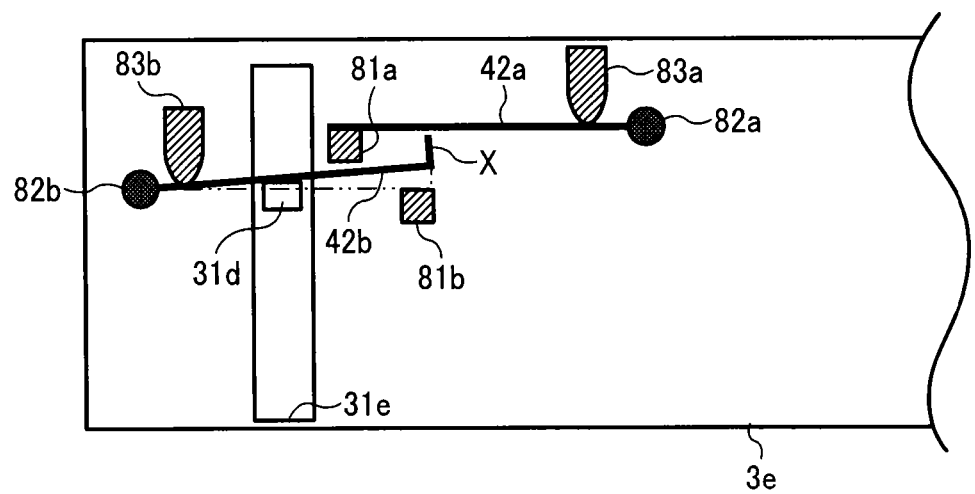

FIGS. 20A and 20B collectively illustrate a system, in which a pair of regulatory member 81a and 81b is established to regulate initial positions of the free ends of the moveable planar electrodes 42a and 42b, respectively. FIGS. 21A and 21B also collectively illustrate the system with the regulatory member 81a and 81b when the residual solid lubricant quantity detecting unit 40 has detected the near end of the solid lubricant. As shown in FIGS. 20A and 20B, the initial positions of the free ends of the respective moveable planar electrodes 42a and 42b are regulated by the regulatory members 81a and 81b. The respective regulatory members 81a and 81b are provided in the covering unit 43. Specifically, the respective regulatory members 81a and 81b are attached to the covering unit 43 with the free ends of the moveable planar electrodes 42a and 42b contacting the regulatory member 81a and 81b. Thus, the moveable planar electrodes 42a and 42b can keep given postures, respectively. With this, a fluctuation of each of the initial positions of the free ends, generally caused by assembling error, can be likely prevented. In addition, when the moveable planar electrodes 42a and 42b is bent and brought in contact with the respective regulatory member 81a and 81b (i.e., under given pressure), fluctuations of the initial positions of the respective free ends, generally caused by inaccurate components (i.e., planar electrodes), can be likely prevented as well. Hence, by regulating the initial positions of the free ends of the moveable planar electrodes 42a and 42b with the respective regulatory member 81a and 81b, the moveable planar electrodes 42a and 42b can keep the given postures, respectively. As a result, a variation in quantity of residual solid lubricant detected by the moveable planar electrodes 42a and 42b (i.e., the near end) can be likely reduced.

Respective positions to regulate the free ends of the moveable planar electrodes 42a and 42b are desirably distanced away from the fixed ends 82a and 82b. Therefore, in this embodiment, the respective moveable planar electrodes 42a and 42b are regulated at the free ends. The pressing unit 31d is positioned between the fixed end 82b of the second moveable planar electrode 42b and the regulatory member 81b to depress the second moveable planar electrode 42b. Since the second moveable planar electrode 42b contacts the same side of the regulatory member 81b as the pressing unit 31d contacts, excessive load is not imposed on the pressing unit 31d even when the second moveable planar electrode 42b is bent. Similarly, since the first moveable planar electrode 42a also contacts the same side of the regulatory member 81a as the second moveable planar electrode 42b contacts, excessive load is not imposed on the pressing unit 31d even when the first moveable planar electrode 42a is bent.

As shown in FIG. 20A, when the free ends of the moveable planar electrodes 42a and 42b are located on the same side (e.g., left in drawing) with each other, the free end of the first moveable planar electrode 42a is located outer side (i.e., the left side in the drawing) of that of the second moveable planar electrode 42b. With this, as shown in FIG. 21A, when the second moveable planar electrode 42b is pressed by the pressing unit 31d and thereby bending toward the first moveable planar electrode 42a, the free end of the second moveable planar electrode 42b does not collide with the regulatory member 81a that regulates the initial position of the free end of the first moveable planar electrode 42a.

Also, as shown in FIG. 20B, when the free ends of the respective first and second moveable planar electrodes 42a and 42b are located on the opposite side to each other, a protruding part X is formed at the free end of the second moveable planar electrode 42b to protrude toward the first moveable planar electrode 42a so that the free end of the second moveable planar electrode 42b can be prohibited to collide with the regulatory member 81a that regulates the initial position of the free end of the first moveable planar electrode 42a even when the second moveable planar electrode 42b bends toward the first moveable planar electrode 42a as shown in FIG. 21B.

Here, these regulatory members 81a and 81b are preferable fixed to the covering unit 43, to which the moveable planar electrodes 42a and 42b are fixed. Specifically, by providing these regulatory members 81a and 81b in the covering unit 43, since fixation and regulation of the free ends of the moveable planar electrodes at the initial positions are executed by the same member (i.e., the covering unit 43), the free ends of the initial positions of the respective moveable planar electrodes 42a and 42b can be more accurately regulated.

In the above-described embodiment, although the initial positions of the free ends of the respective first and second moveable planar electrodes 42a and 42b are regulated by the respective regulatory members 81a and 81b, only the initial position of the free end of the first moveable planar electrode 42a can be regulated by the regulatory member 81a. Even with such a configuration, a variation in quantity of residual solid lubricant detected by the moveable planar electrodes 42a and 42b (i.e., the near end) can be reduced again. In addition, as shown in FIGS. 20A to 21B, since the initial position of the free end of the second moveable planar electrode 42b is regulated by the regulatory member 81b, an amount of deflection of the second moveable planar electrode 42b caused until the end of the solid lubricant can be constant. Hence, since an increase in resilience from the second moveable planar electrode 42b to the pressing unit 31d can be minimized or suppressed, a decrease in contacting pressure of the solid lubricant 3b against the coating roller 3a generated after the detection of the near end can be suppressed.

Now, various modifications of the present invention are described herein below with reference to the applicable drawings.

Figure 11:
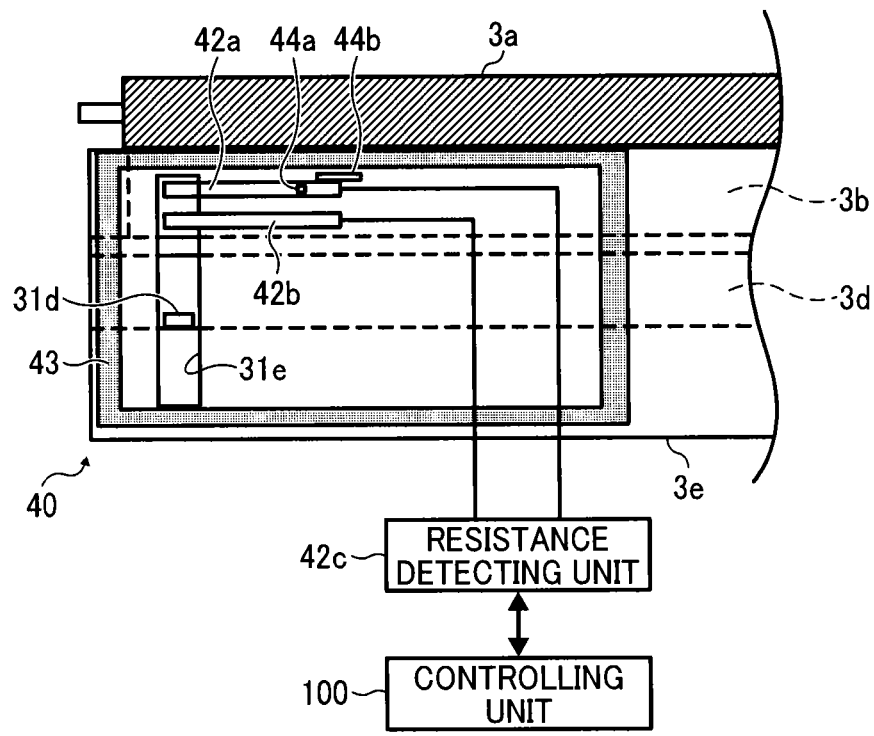
FIG. 11 is a diagram schematically illustrating a configuration of one longitudinal end of the solid lubricant supply system according to a first modification of the present invention.

Initially, a first modification of the present invention is described with reference to FIGS. 11 and 12. FIG. 11 schematically illustrates one longitudinal end of the solid lubricant supply system 3 according to the first modification of the present invention. As shown there, in this first modification of the solid lubricant supply system 3, the first moveable planar electrode 42a is supported to be able to freely pivot around its axis. Specifically, in this first modification, the first moveable planar electrode 42a is supported to be able to freely pivot around a rotary shaft 44a that extends (e.g., protrudes) from the covering unit 43. In addition, a pivoting movement regulating section 44b is provided in the covering unit 43 to regulate pivoting of the first moveable planar electrode 42a by its gravity (i.e., pivoting counter-clockwise in the drawing).

Figure 12:
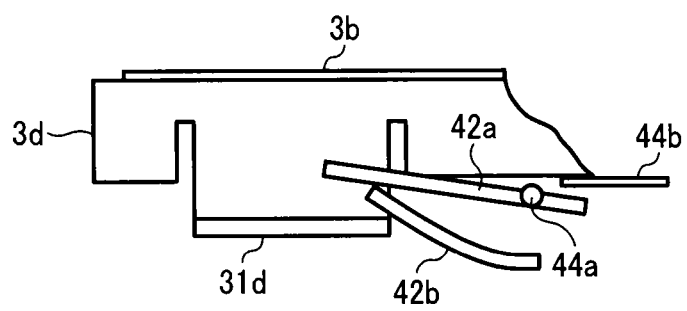
FIG. 12 is a diagram illustrating an contact state of the first moveable planar electrode and the second moveable planar electrode of the modified solid lubricant supply system when usage of the solid lubricant enters the terminal stage in the first modification of the present invention.

When the second moveable planar electrode 42b is pressed by the pressing unit 31d and depresses the first moveable planar electrode 42a after the detection of the near end, since the first moveable planar electrode 42a is enabled to freely pivot around the rotary shaft 44a, the first moveable planar electrode 42a pivots clockwise in the drawing and moves together with the second moveable planar electrode 42b as shown in FIG. 12. With this, also in this first modification, even after the detection of the near end, the solid lubricant holding unit 3d can move toward the coating roller 3a as well. Hence, the solid lubricant can be supplied to the surface of the photoconductor 1 even after the detection of the near end, and accordingly the surface of the photoconductor 1 can be protected by the solid lubricant even if image formation is executed before a new solid lubricant is prepared to be replaced. In addition, since the first moveable planar electrode 42a moves together with the second moveable planar electrode 42b as it pivots, the reaction force from the first and second moveable planar electrodes 42a and 42b after the detection of the near end can be more effectively reduced than the embodiment, in which the first moveable planar electrode 42a moves together with the second moveable planar electrode 42b while it deforms and deflects. With this, a decrease in contacting pressure of the solid lubricant 3b against the coating roller 3a after the detection of the near end can be more effectively suppressed than in the earlier described embodiment. As a result, the decrease in an quantity of solid lubricant 3b supplied to the surface of the photoconductor 1 after the detection of the near end may be further reduced, and the surface of the photoconductor 1 can be precisely protected by the solid lubricant after the near end is detected by the residual solid lubricant quantity detecting unit 40 until the solid lubricant is ready to be replaced and actually replaced.

Figure 13A:
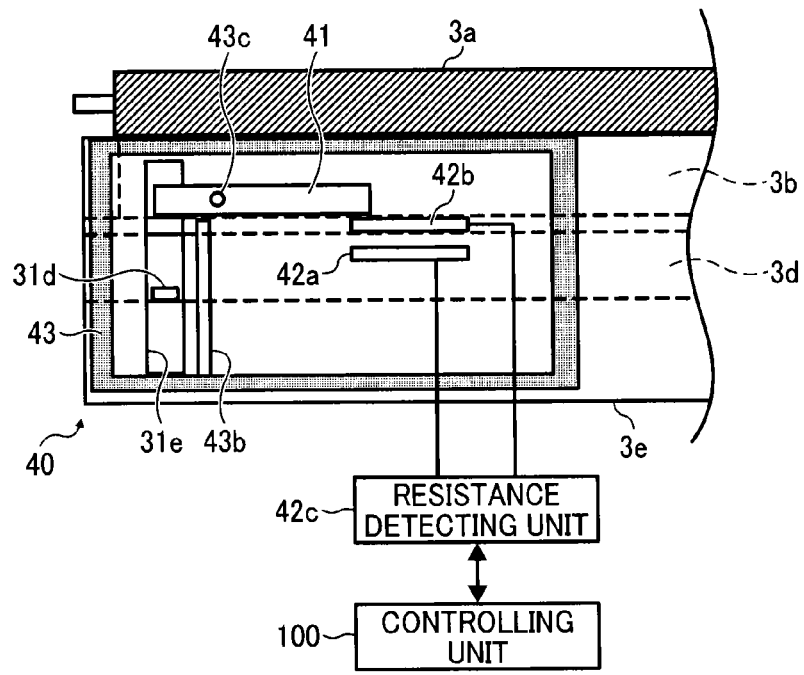
FIGS. 13A and 13B are diagrams schematically illustrating a configuration of one longitudinal end of the solid lubricant supply system collectively according to a second modification of the present invention.
Figure 13B:
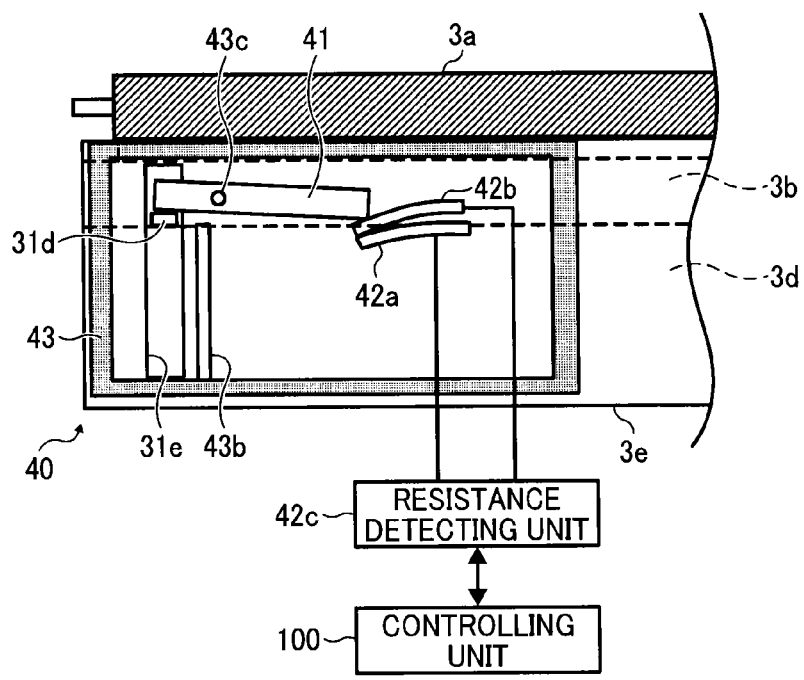
Figure 16:
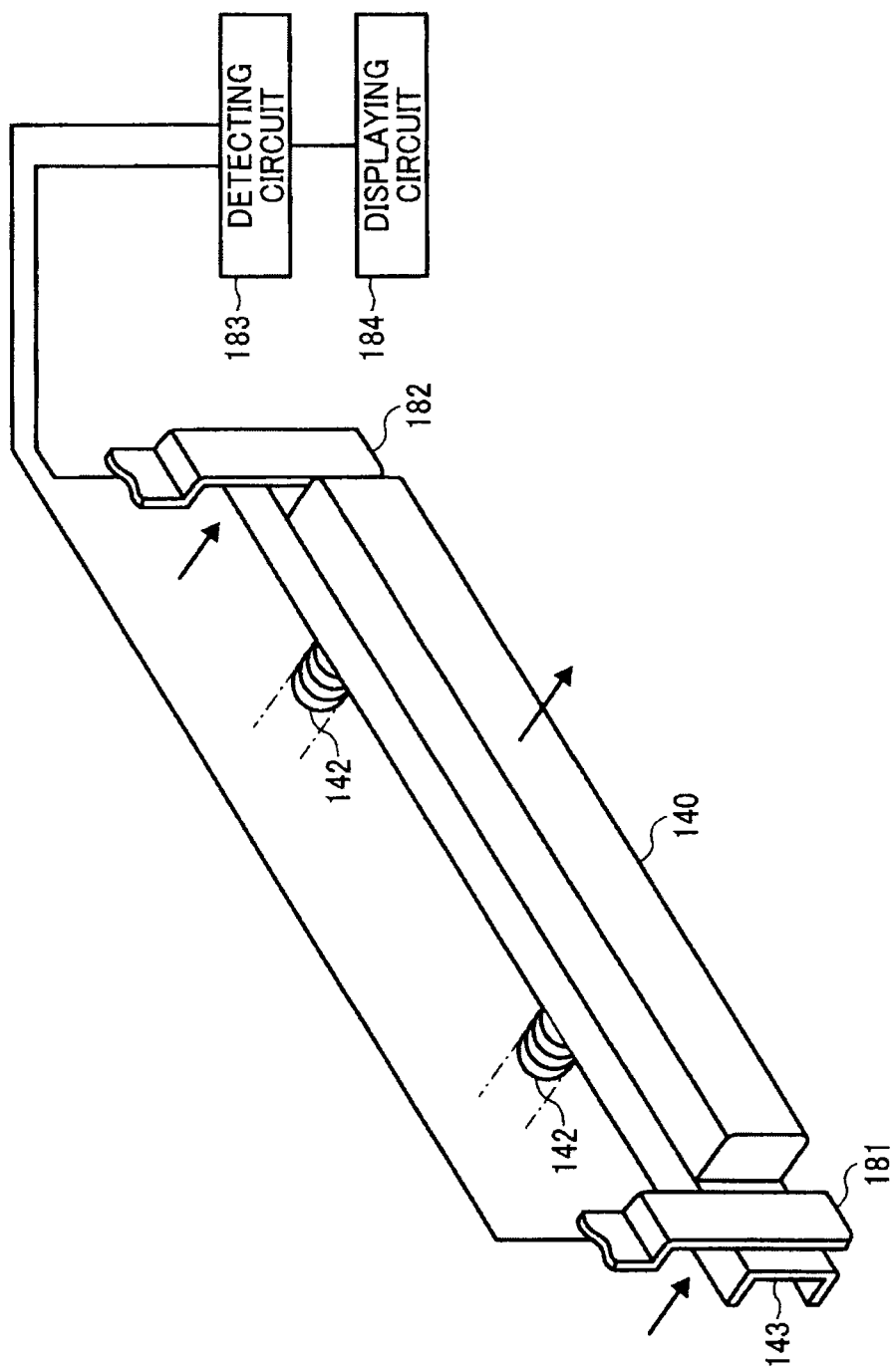
FIG. 16 is a diagram schematically illustrating a conventional solid lubricant-near end detecting unit employed in a conventional solid lubricant supply system.

Now, a second modification of the present invention is described with reference to FIGS. 13A and 13B. FIG. 13 schematically illustrates one longitudinal end of the solid lubricant supply system 3 again according to the second modification of the present invention. The second modification of the present invention of FIG. 13 includes a pivoting type detecting unit 41. The pivoting type detecting unit 41 is supported to be able to freely pivot around a shaft 43c fixed to the covering unit 43. A left end of the pivoting type detecting unit 41 in the drawing (i.e., a longitudinal end of the solid lubricant 3b) is opposed to the pressing unit 31d. By contrast, a right end of the pivoting type detecting unit 41 in the drawing (i.e., a longitudinal center side of the solid lubricant) engages with the second moveable planar electrode 42b.

In addition, in the covering unit 43, a partition wall 43b is provided to partition a space covered by the covering unit 43 into a part, in which the openings 31e is arranged and that in which the first and second moveable planar electrode 42a and 43b are arranged. In this second modification of the present invention, when the solid lubricant 3b is scraped off and is consumed and accordingly the height thereof decreases, the pressing unit 31d ultimately contacts the pivoting type detecting unit 41. When the solid lubricant 3b is further scraped off and the height thereof further decreases, the pressing unit 31d depresses the left end of the pivoting type detecting unit 41 in the drawing. Consequently, the pivoting type detecting unit 41 pivots clockwise in the drawing and its right end depresses the second moveable planar electrode 42b toward the moveable planar electrode 42a. Subsequently, when the solid lubricant 3b comes to the near end, the second moveable planar electrode 42b contacts the first moveable planar electrode 42a so that the near end is accordingly detected.

When the solid lubricant 3b is consumed after the detection of the near end and accordingly the solid lubricant holding unit 3d moves, the pivoting type detecting unit 41 further pivots and depresses the second moveable planar electrode 42b toward the first moveable planar electrode 42a. As a result, as shown in FIG. 13B, the free end of the first moveable planar electrode 42a moves in a direction to separate from the coating roller 3a together with the moveable planar electrode 42b.

In this second modification, the first and second moveable planar electrodes 42a and 42b can be provided away from a contact part between the solid lubricant 3b and the coating roller 3a. With this, powder shaved off by the coating roller 3a from the solid lubricant 3b can be inhibited to adhere to the first and second moveable planar electrodes 42a and 42b. Accordingly, conductive failure generally caused between the first and second moveable planar electrodes 42a and 42b by the powder solid lubricant 3b adhering thereto can be suppressed, so that the near end of the solid lubricant 3b can be more precisely detected.

In addition, in this second modification, since the space covered by the covering unit 43 is partitioned by the partition 43b into a section, in which the opening 31e is established, and that, in which the first and second moveable planar electrodes 42a and 42b are provided, the solid lubricant powder entering from the opening 31e is further effectively inhibited to adhere to the first and second moveable planar electrodes 42a and 42b. Here, the covering unit 43 and the partition wall 43b are desirably made of plastic and integrally molded. With this, the integrated covering unit 43 and partition wall 43b can more effectively reduce the number of parts while saving cost than a unit, in which the covering unit 43 and the partition wall 43b are composed of separate members. Otherwise, the partition wall 43b can be provided in the storage case 3e. Also in this situation, by integrally molding the partition wall 43b and the storage case 3e made of plastic, the number of parts can be reduced while saving cost as well. Yet otherwise, by providing the partition walls in the respective covering unit 43 and storage case 3e and combining these covering unit 43 and storage case 3e the space covered by the covering unit 43 is partitioned into a section, in which the openings 31e is established, and that, in which the first and second moveable planar electrodes 42a and 42b are provided.

Now, a third modification of the present invention is described with reference to FIG. 14. FIG. 14 schematically illustrates a cross section of one longitudinal end of the solid lubricant supply system 3 according to the third modification. As shown there, in this third modification, one end of the first moveable planar electrode 42a is secured to near an upper end of the opening 31e in the drawing so that the first moveable planar electrode 42a can cover an upper half of the opening 31e. By contrast, one end of the second moveable planar electrode 42b is secured to near a lower end of the opening 31e in the drawing so that the second moveable planar electrode 42b can cover a lower half of the openings 31e. The second moveable planar electrode 42b extends and enters the storage case 3e through the opening 31e so that its free end (i.e., an upper end in the drawing) is opposed to the first moveable planar electrode 42a. The pressing unit 31d provided in the solid lubricant holding unit 3d has an arc-shaped cross section. Also, as shown in FIG. 14, at the free end of the first moveable planar electrode 42a (i.e., at a bottom in the drawing), a conductive contact part 421a is provided to engage with the second moveable planar electrode 42b.

Accordingly, as shown in the drawing 15A, in an early usage stage of the solid lubricant 3b, the pressing unit 31d is spaced from the second moveable planar electrode 42b, and accordingly the second moveable planar electrode 42b is also spaced from the first moveable planar electrodes 42a as well. Similar to the above-described embodiment and modification, when the solid lubricant 3b is consumed, the pressing unit 31d of the solid lubricant holding members 3d comes to contact the second moveable planar electrode 42b, and then the free ends of the second moveable planar electrode 42b moves toward the first moveable planar electrode 42a. Subsequently, as shown in FIG. 13, when the solid lubricant 3b comes to the near end, the second moveable planar electrode 42b contacts a contact part 421a of the first moveable planar electrode 42a, thereby electrically connecting to the first moveable planar electrode 42a while detecting the near end at the same time.

When the solid lubricant 3b is consumed and the solid lubricant holding unit 3d moves toward the coating roller 3a after the detection of the near end as the solid lubricant supplying operation, the moveable pressing unit 31d further presses the second moveable planar electrode 42b against the first moveable planar electrode 42a. Consequently, as shown in FIG. 15B, the first moveable planar electrode 42a deforms outside a right side in the drawing together with the second moveable planar electrode 42b as well. With this, in the third modification, even after the detection of the near end, the solid lubricant holding unit 3d can move toward the coating roller 3a and able to continuously supply the solid lubricant 3b onto the surface of the photoconductor 1. Accordingly, since the first moveable planar electrode 42a deforms outside together with the second moveable planar electrode 42b as well, a rise of sliding resistance caused between the pressing unit 31d and the second moveable planar electrode 42b can be suppressed as well. With this, the solid lubricant holding unit 3d can smoothly move toward the coating roller 3a even when the solid lubricant 3b is supplied and consumed after the detection of the near end while suppressing a decrease in contacting pressure of the solid lubricant 3b against the coating roller 3a. Hence, a decline in a quantity of the solid lubricant 3b supplied to the surface of the photoconductor 1 after the detection of the near end can be suppressed, while precisely protecting the surface of the photoconductor 1 until a new solid lubricant 3b is prepared and replaced with the old solid lubricant 3b.

Although the present invention is applied to the solid lubricant supply system 3 that supplies the solid lubricant 3b to the surface of the photoconductor 1 in the above-described various embodiment and modifications of the present invention, it can be also applied to a solid lubricant supply system that supplies the solid lubricant 3b to an intermediate transfer belt 56 as well.

According to a typical embodiment of the present invention, lubricant supplying operation can be continuously executed while moving a lubricant holding unit as the solid lubricant is consumed even after a residual solid lubricant quantity detecting unit has detected a prescribed quantity of the residual solid lubricant. In addition, when lubricant holding unit subsequently presses a second electrode against the first electrode, the first electrode moves together with the second electrode. With this, even after the residual solid lubricant quantity detecting unit has detected a prescribed quantity of the residual solid lubricant, the second lubricant holding unit can move in a direction, in which the first and second electrodes move, as the solid lubricant is scraped off by a lubricant supplying unit that supplies the solid lubricant to a lubricant supplying target. With this, even after the residual solid lubricant quantity detecting unit has detected a prescribed quantity of the residual solid lubricant, the lubricant supplying unit can continuously scrape off the solid lubricant and is able to protect the lubricant supplying target. In addition, waste of the solid lubricant can be more effectively inhibited than in a conventional system as well.

According to another embodiment of the present invention, a decline in the quantity of the solid lubricant supplied to a solid lubricant supplying target after a residual solid lubricant quantity detecting unit detects a first stage, in which the residual solid lubricant quantity is below a given level, can be likely avoided. In addition, even before the solid lubricant is ready to replace after the residual solid lubricant quantity detecting unit detects the first stage, the solid lubricant can be precisely supplied continuously to the photoconductor 1 to protect the surface of the photoconductor 1. Because, a solid lubricant supply system comprises: a solid lubricant; a solid lubricant supplier to receive the solid lubricant and supply the solid lubricant to a solid lubricant supplying target; a first moveable planar electrode; and a second moveable planar electrode opposed to the first moveable planar electrode. The second moveable planar electrode is moved toward the first moveable planar electrode as the solid lubricant is consumed. At least one residual solid lubricant quantity detecting unit is provided to detect a quantity of the residual solid lubricant. The residual solid lubricant quantity detecting unit detects a first stage, in which the residual solid lubricant quantity is below a given level, by detecting electric conduction between the first moveable planar electrode and the second moveable planar electrode when the first moveable planar electrode and the second moveable planar electrode contact each other. The first moveable planar electrode is enabled to move together with the second moveable planar electrode while contacting the second moveable planar electrode when the second moveable planar electrode is further moved after the residual solid lubricant quantity detecting unit detects the first stage.

According to yet another embodiment of the present invention, it can be suppressed to execute lubricant supply operation in a depleted stage of the solid lubricant. Because, in the solid lubricant supply system, a solid lubricant used up determining unit is provided to determine that the solid lubricant is used up when a quantity of solid lubricant supplying operation executed after the first stage, in which the detecting unit detects that the quantity of the residual solid lubricant is below the given level, reaches a given threshold as a second stage.

According to yet another embodiment of the present invention, a configuration of the apparatus can be simplified. Because, in the solid lubricant supply system, the solid lubricant supply system further comprises a pressing unit to press the solid lubricant against the solid lubricant supplier as the solid lubricant is consumed while directly or indirectly pressing the second moveable planar electrode toward the first moveable planar electrode, The second moveable planar electrode is elastically deformed to partially move toward the first moveable planar electrode when directly or indirectly pressed by the pressing unit. The second moveable planar electrode is elastically deformed to partially move toward the first moveable planar electrode when directly or indirectly pressed by the pressing unit.

According to yet another embodiment of the present invention, the solid lubricant can be likely inhibited to adhere to the first and second moveable planar electrodes. Because, in the solid lubricant supply system, a storage case is provided to accommodate the solid lubricant, while disposing the residual solid lubricant quantity detecting unit outside the storage case.

According to yet another embodiment of the present invention, the powder of the solid lubricant scattered to an outside of the solid lubricant supply system from the opening can be likely inhibited to dirty the apparatus. In addition, the solid lubricant dispersed in a powder state can be likely inhibited to adhere to the first and second moveable planar electrodes. Because, in the solid lubricant supply system, a covering unit is provided to cover the residual solid lubricant quantity detecting unit and the storage case has an openings, through which the pressing unit penetrates and moves to either directly or indirectly press the second moveable planar electrode as the solid lubricant is consumed. In such a configuration, the opening is covered by the covering unit together with the residual solid lubricant quantity detecting unit.

According to yet another embodiment of the present invention, the residual solid lubricant quantity detecting unit can be easily replaced. Because, in the solid lubricant supply system 3, the covering unit holds the residual solid lubricant quantity detecting unit.

According to yet another embodiment of the present invention, the first and second moveable planar electrodes can be provided away from a contact part between the solid lubricant 3b and the coating roller. As a result, powder shaved off by the coating roller from the solid lubricant can be inhibited to adhere to the first and second moveable planar electrodes. Because, in the solid lubricant supply system, a pivoting type detecting unit is provided to pivot and press the second moveable planar electrode toward the first moveable planar electrode when pressed by the pressing unit moving as the solid lubricant is consumed.

According to yet another embodiment of the present invention, the solid lubricant powder entering the covering unit from the opening can be effectively inhibited to adhere to the first and second moveable planar electrodes. Because, in the solid lubricant supply system, a partition is provided to partition an internal space into multiple sections. The storage case has an opening, through which the pressing unit 31d penetrates and moves to either directly or indirectly press the second moveable planar electrode as the solid lubricant is consumed, and the residual solid lubricant quantity detecting unit is disposed outside the storage case accommodating the solid lubricant. In such a configuration, the residual solid lubricant quantity detecting unit and the opening are partitioned by the partition.

According to yet another embodiment of the present invention, even when a consumption quantity of the solid lubricant is different along its longitudinal direction, the residual solid lubricant quantity detecting unit placed on one end, in which the consumption quantity of the solid lubricant is greater, can detect the near end when the one end of solid lubricant comes to the near end. Accordingly, a problem that the solid lubricant is depleted at a side, in which it is intensively consumed and cannot supply and protect and thereby damaging the surface of the photoconductor 1 or the like can be likely prevented. Because, in the solid lubricant supply system 3, a pair of residual solid lubricant quantity detecting units is disposed near both longitudinal ends of the solid lubricant, respectively.

According to yet another embodiment of the present invention, a variation in residual solid lubricant quantity detected by the residual solid lubricant quantity detecting unit 40 (i.e., the near end) can be likely reduced. Because, in the solid lubricant supply system 3, a regulatory member is provided to regulate at least an initial position of the first moveable planar electrode 42a or the like.

According to yet another embodiment of the present invention, an initial position of the first moveable planar electrode can be precisely regulated. Because, in the solid lubricant supply system, the first moveable planar electrode is cantilevered and the regulatory member regulates the initial position of a free end of the first moveable planar electrode.

According to yet another embodiment of the present invention, since fixation and regulation of the free ends of the moveable planar electrodes at the initial positions are executed by the same member (i.e., the covering unit), the free ends of the initial positions of the respective moveable planar electrodes can be more accurately regulated. Because, in the solid lubricant supply system, a covering unit is provided to hold the regulatory member. The residual solid lubricant quantity detecting unit is disposed outside the storage case accommodating the solid lubricant, the storage case having an opening, through which the pressing unit penetrates and moves to either directly or indirectly press the second moveable planar electrode as the solid lubricant is consumed. In such a configuration, the residual solid lubricant quantity detecting unit and the opening are covered by the covering unit.

According to yet another embodiment of the present invention, the near end of the solid lubricant can be precisely detected while inhibiting image forming operation with the depleted solid lubricant. Hence, chronological degradation of the photoconductor 1 can be suppressed. Because, in the solid lubricant supply system 3, an image forming apparatus comprises: an image bearer to bear a first image; a transfer unit to transfer the first image borne on image bearer onto a recording member to form a second image thereon; and the above-described solid lubricant supply system. In such a configuration, the solid lubricant supply system supplies the solid lubricant onto a surface of the image bearer. According to yet another embodiment of the present invention, the near end of the solid lubricant can be precisely detected while inhibiting image forming operation with the depleted solid lubricant. Hence, a process cartridge capable of suppressing chronological degradation of the photoconductor can be obtained. Because, a process cartridge detachably attached to an image forming apparatus includes an image bearer to bear a first image, a transfer unit to transfer the first image borne on image bearer onto a recording member to form a second image thereon, and the above-described solid lubricant supply system.

Numerous additional modifications and variations of the present invention are possible in light of the above teachings. It is therefore to be understood that within the scope of the appended claims, the present invention may be executed otherwise than as specifically described herein. For example, the solid lubricant supply system, the image forming apparatus, and the process cartridge are not limited to the above-described various embodiments and may be altered as appropriate.

What is claimed is:

1. A lubricant supply system, comprising:
a lubricant;
a lubricant supplier to supply the lubricant to a lubricant supplying target;
a first planar electrode;
a second planar electrode moved toward the first planar electrode as the lubricant is consumed; and
a lubricant quantity detector to detect a quantity of the lubricant, the lubricant quantity detector detecting a first stage, in which the lubricant quantity is below a given level, by detecting electric conduction between the first planar electrode and the second planar electrode when the first planar electrode and the second planar electrode contact each other,
wherein the first planar electrode is enabled to move together with the second planar electrode while contacting the second planar electrode when the second planar electrode is further moved after the lubricant quantity detector detects the first stage.

2. The lubricant supply system as claimed in claim 1, further comprising a lubricant used up detector to determine that the lubricant is used up in a second stage when an amount of lubricant supplying operation executed after the first stage reaches a given threshold.

3. The lubricant supply system as claimed in claim 1, further comprising a pressing unit to press the lubricant against the lubricant supplier as the lubricant is consumed while directly or indirectly pressing the second planar electrode toward the first planar electrode,
wherein the second planar electrode is elastically deformed to partially move toward the first planar electrode when directly or indirectly pressed by the pressing unit.

4. The lubricant supply system as claimed in claim 1, further comprising a storage case to accommodate the lubricant, wherein the lubricant quantity detector is disposed outside the storage case.

5. The lubricant supply system as claimed in claim 4, further comprising a covering unit to cover the lubricant quantity detector,
wherein the storage case has an opening, through which the pressing unit penetrates and moves to either directly or indirectly press the second planar electrode as the lubricant is consumed, the opening covered by the covering unit together with the lubricant quantity detector.

6. The lubricant supply system as claimed in claim 5, wherein the covering unit holds the lubricant quantity detector.

7. The lubricant supply system as claimed in claim 3, further comprising a pivoting member to pivot and press the second planar electrode toward the first planar electrode when pressed by the pressing unit moving as the lubricant is consumed.

8. The lubricant supply system as claimed in claim 7, further comprising a partition that partitions an internal space of the lubricant supply system into multiple sections,
wherein the storage case has an opening, through which the pressing unit penetrates and moves to either directly or indirectly press the second planar electrode as the lubricant is consumed, and the lubricant quantity detector is disposed outside the storage case accommodating the lubricant, wherein the lubricant quantity detector and the opening are partitioned by the partition.

9. The lubricant supply system as claimed in claim 1, wherein a pair of lubricant quantity detectors is disposed adjacent to respective longitudinal ends of the lubricant.

10. The lubricant supply system as claimed in claim 1, further comprising a regulatory member to regulate at least an initial position of the first planar electrode.

11. The lubricant supply system as claimed in claim 10, wherein the first planar electrode is cantilevered and the regulatory member regulates the initial position of a free end of the first planar electrode.

12. The lubricant supply system as claimed in claim 10, further comprising a covering unit to hold the regulatory member,
wherein the lubricant quantity detector is disposed outside the storage case accommodating the lubricant, the storage case having an opening, through which the pressing unit penetrates and moves to either directly or indirectly press the second planar electrode as the lubricant is consumed,
wherein the lubricant quantity detector and the opening are covered by the covering unit.

13. An image forming apparatus comprising the lubricant supply system according to claim 1.

14. A process cartridge comprising the lubricant supply system according to claim 1.

15. The lubricant supply system as claimed in claim 1, wherein the second planar electrode is opposed to the first planar electrode.

16. The lubricant supply system as claimed in claim 1, wherein the lubricant quantity detector detects a quantity of residual lubricant.

17. The lubricant supply system as claimed in claim 1, wherein the first planar electrode and the second planar electrode are movable.

18. The lubricant supply system as claimed in claim 1, wherein the lubricant is a solid lubricant.

19. A lubricant supply system, comprising:
a lubricant;
a lubricant supplier to supply the lubricant to a lubricant supplying target;
a first planar electrode;
a second planar electrode moved toward the first planar electrode as the lubricant is consumed; and
a lubricant quantity detector to detect electric conduction between the first planar electrode and the second planar electrode when the first planar electrode and the second planar electrode contact each other,
wherein the first planar electrode is enabled to move together with the second planar electrode while contacting the second planar electrode when the second planar electrode is further moved after the lubricant quantity detector detects a first stage, in which a lubricant quantity is below a given level.

20. The lubricant supply system as claimed in claim 19, further comprising a lubricant used up detector to determine that the lubricant is used up in a second stage when an amount of lubricant supplying operation executed after the first stage reaches a given threshold.

* * * * *